United States Patent
Zeng et al.

(10) Patent No.: US 10,631,323 B2
(45) Date of Patent: Apr. 21, 2020

(54) DELAYED CONTROL FEEDBACK IN A TIME DIVISION DUPLEX CARRIER UTILIZING COMMON BURSTS

(71) Applicant: QUALCOMM Incorporated, San Diego, CA (US)

(72) Inventors: Wei Zeng, San Diego, CA (US); Krishna Kiran Mukkavilli, San Diego, CA (US); Tingfang Ji, San Diego, CA (US); Joseph Binamira Soriaga, San Diego, CA (US); Peter Pui Lok Ang, San Diego, CA (US); Jing Jiang, San Diego, CA (US); Tao Luo, San Diego, CA (US); Naga Bhushan, San Diego, CA (US); John Edward Smee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 183 days.

(21) Appl. No.: 15/274,738

(22) Filed: Sep. 23, 2016

(65) Prior Publication Data

US 2017/0164397 A1  Jun. 8, 2017

Related U.S. Application Data

(60) Provisional application No. 62/264,801, filed on Dec. 8, 2015.

(51) Int. Cl.
*H04W 72/12* (2009.01)
*H04L 5/14* (2006.01)
(Continued)

(52) U.S. Cl.
CPC ....... *H04W 72/1278* (2013.01); *H04L 1/1854* (2013.01); *H04L 5/0055* (2013.01);
(Continued)

(58) Field of Classification Search
None
See application file for complete search history.

(56) References Cited

U.S. PATENT DOCUMENTS 9,532,340 B2 * 12/2016 Lu .................. H04W 72/042
10,116,422 B2 10/2018 Chen et al.
(Continued)

FOREIGN PATENT DOCUMENTS

RU  2474975 C2  2/2013
WO  2012074900 A2  6/2012
(Continued)

OTHER PUBLICATIONS

International Search Report and Written Opinion—PCT/US2016/055590—ISA/EPO—dated Dec. 23, 2016.

*Primary Examiner* — Hassan A Phillips
*Assistant Examiner* — Gautam Sharma
(74) *Attorney, Agent, or Firm* — Loza & Loza, LLP/Qualcomm

(57) ABSTRACT

Various aspects of the disclosure provide for apparatus, methods, and software for implementing a time division duplex (TDD) wireless communication system that can utilize configurable delays to relax data processing timelines when needed. By implementing these configurable delays, very high data rates may be accommodated at the same time as lower data rates for devices that may have reduced or lesser processing capabilities.

88 Claims, 15 Drawing Sheets

(51) Int. Cl.
*H04L 5/00* (2006.01)
*H04W 72/04* (2009.01)
*H04L 1/18* (2006.01)

(52) U.S. Cl.
CPC .............. *H04L 5/14* (2013.01); *H04L 5/1469* (2013.01); *H04W 72/0446* (2013.01); *H04W 72/1268* (2013.01); *H04W 72/1273* (2013.01); *H04L 1/1864* (2013.01)

(56) References Cited

U.S. PATENT DOCUMENTS

| | | | | |
|---|---|---|---|---|
| 2003/0063619 A1* | 4/2003 | Montano | ........... | H04L 29/12009 370/443 |
| 2003/0235160 A1* | 12/2003 | Saifuddin | ............. | H04W 52/48 370/326 |
| 2005/0213575 A1* | 9/2005 | Shin | ...................... | H04L 1/1628 370/389 |
| 2006/0209837 A1* | 9/2006 | Lee | ......................... | H04L 49/90 714/748 |
| 2007/0214399 A1* | 9/2007 | Lim | ...................... | H04L 1/1877 714/746 |
| 2008/0130526 A1* | 6/2008 | Che | ...................... | H04B 7/2656 370/280 |
| 2008/0181142 A1* | 7/2008 | Garrett | ................. | H04B 7/2656 370/280 |
| 2008/0240719 A1* | 10/2008 | Kim | ...................... | H04B 7/2643 398/96 |
| 2009/0040959 A1* | 2/2009 | Jung | ..................... | H04L 1/1867 370/312 |
| 2009/0046606 A1* | 2/2009 | Wan | ...................... | H04J 3/0682 370/280 |
| 2009/0181689 A1* | 7/2009 | Lee | ........................ | H04L 1/1854 455/450 |
| 2009/0257424 A1* | 10/2009 | Wu | ....................... | H04L 5/0058 370/345 |
| 2009/0276676 A1* | 11/2009 | Lee | ........................ | H04L 1/1812 714/749 |
| 2010/0037114 A1* | 2/2010 | Huang | ................... | H04L 1/1829 714/749 |
| 2010/0322229 A1 | 12/2010 | Kim et al. | | |
| 2011/0002309 A1* | 1/2011 | Park | ....................... | H04L 1/1607 370/335 |
| 2011/0041027 A1* | 2/2011 | Fong | .................... | H04L 1/1812 714/749 |
| 2011/0051666 A1* | 3/2011 | Kim | ....................... | H04L 1/0004 370/328 |
| 2011/0080865 A1* | 4/2011 | Tsai | ..................... | H04B 7/1555 370/315 |
| 2011/0126068 A1* | 5/2011 | Lee | ........................ | H04L 1/1607 714/748 |
| 2011/0176461 A1* | 7/2011 | Astely | .................. | H04B 7/2656 370/280 |
| 2011/0205928 A1* | 8/2011 | Pelletier | ................ | H04L 1/1883 370/252 |
| 2011/0310784 A1* | 12/2011 | Park | ....................... | H04L 1/1854 370/312 |
| 2011/0310789 A1 | 12/2011 | Hu et al. | | |
| 2013/0028124 A1* | 1/2013 | Horiuchi | ................ | H04L 1/1854 370/252 |
| 2014/0086116 A1* | 3/2014 | Seo | ........................ | H04W 72/14 370/280 |
| 2016/0013896 A1* | 1/2016 | Sun | ....................... | H04L 1/1854 370/280 |
| 2016/0056927 A1* | 2/2016 | Liu | ........................ | H04W 28/04 370/216 |
| 2016/0099799 A1* | 4/2016 | Bashar | .................. | H04W 72/02 370/280 |
| 2016/0353478 A1* | 12/2016 | Kim | ....................... | H04W 72/12 |
| 2017/0064704 A1* | 3/2017 | Seo | ........................ | H04W 72/02 |
| 2017/0093540 A1* | 3/2017 | Lei | ........................ | H04L 5/0044 |
| 2018/0254860 A1* | 9/2018 | Wong | ................... | H04L 1/1819 |

FOREIGN PATENT DOCUMENTS

WO 2014070761 A1 5/2014
WO WO-2014153751 A1 10/2014

* cited by examiner

DELAYED CONTROL FEEDBACK IN A TIME DIVISION DUPLEX CARRIER UTILIZING COMMON BURSTS

PRIORITY CLAIM

This application claims priority to and the benefit of provisional patent application No. 62/264,801 filed in the United States Patent and Trademark Office on Dec. 8, 2015, the entire content of which is incorporated herein by reference as if fully set forth below in its entirety and for all applicable purposes.

TECHNICAL FIELD

The present disclosure relates generally to wireless communication systems, and more particularly, to delays in physical layer ACK feedback, scheduling decisions, and the application of scheduling grants in order to relax a processing timeline in wireless communication devices that utilize a time division duplex (TDD) carrier having subframe structures that include common bursts.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Examples of telecommunication standards include Long Term Evolution (LTE), LTE-Advanced, and LTE-Advanced Pro, which include a set of enhancements to the Universal Mobile Telecommunications System (UMTS) mobile standard promulgated by Third Generation Partnership Project (3GPP). LTE and its variants are designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in multiple access technologies technology. Preferably, these improvements should be applicable to existing and developing multi-access technologies and the telecommunication standards that employ such technologies.

However, as the demand for mobile broadband access continues to increase, there exists a need for further improvements in multiple access technologies technology. For example, the spectrum allocated to wireless communication networks employing multiple access technology is being (or is expected to be) allocated in such a way that paired carriers, utilized in many existing frequency division duplex (FDD) systems, are either not available, or not available in matched bandwidth configurations. Accordingly, time division duplex (TDD) carriers are expected to be utilized in many future deployments for wireless communication systems.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure provide for apparatus, methods, and software for implementing a time division duplex (TDD) wireless communication system that can utilize configurable delays to relax processing timelines when needed. By implementing these configurable delays, very high data rates may be accommodated at the same time as lower data rates for devices that may have reduced or lesser processing capabilities.

An aspect of the disclosure provides a method of wireless communication in a synchronous network for a scheduling entity to communicate with a set of one or more subordinate entities utilizing a time division duplex (TDD) carrier that includes a plurality of subframes. The method determines a delay for an uplink acknowledgment (ACK) transmission to be transmitted by a subordinate entity. The delay corresponds to an amount of time available for the subordinate entity to process a downlink data packet prior to transmitting the uplink ACK. The method transmits the determined delay to the subordinate entity utilizing a control channel transmission during a first subframe. The method further transmits the downlink data packet to the subordinate entity during the first subframe. The method also receives the uplink ACK from the subordinate entity during a second subframe in accordance with the delay.

Another aspect of the disclosure provides a method of wireless communication in a synchronous network for a scheduling entity to communicate with a set of one or more subordinate entities utilizing a TDD carrier that includes a plurality of subframes. The method determines a delay for a control information transmission to be transmitted by the scheduling entity. The delay corresponds to an amount of time available for the scheduling entity to process a data packet of a first subframe prior to transmitting the control information transmission in a second subframe. The method further transmits the control information to the subordinate entity during the second subframe in accordance with the delay.

Another aspect of the disclosure provides a method of wireless communication in a synchronous network for a scheduling entity to communicate with a set of one or more subordinate entities utilizing a TDD carrier that includes a plurality of subframes. The method determines a delay for a subordinate entity to apply a grant or assignment of resources. The delay corresponds to an amount of time available for the subordinate entity to process the grant or assignment prior to configuring a transceiver to utilize the granted or assigned resources. The method further transmits the determined delay to the subordinate entity utilizing a control channel transmission. The method further transmits the grant or assignment of resources to the subordinate entity during a first subframe, and communicates with the subordinate entity utilizing the granted or assigned resources during a second subframe in accordance with the delay.

Another aspect of the disclosure provides an apparatus for wireless communication. The apparatus includes a communication interface, a memory stored with executable code, and a processor operatively coupled to the communication interface and memory. The communication interface is configured to communicate with a set of one or more subordinate entities utilizing a TDD carrier in a synchronous network, and the TDD carrier includes a plurality of subframes. The processor is configured by the executable code to determine a delay for an uplink acknowledgment (ACK) transmission to be transmitted by a subordinate entity. The delay corresponds to an amount of time available for the subordinate entity to process a downlink data packet prior to transmitting the uplink ACK. The processor is further configured to transmit the determined delay to the subordinate entity utilizing a control channel transmission during a first subframe. The processor is further configured to transmit the downlink data packet to the subordinate entity during the first subframe. The processor is further configured to receive the uplink ACK from the subordinate entity during a second subframe in accordance with the delay.

Another aspect of the disclosure provides an apparatus for wireless communication. The apparatus includes a communication interface, a memory stored with executable code, and a processor operatively coupled to the communication interface and memory. The communication interface is configured to communicate with a set of one or more subordinate entities utilizing a TDD carrier in a synchronous network. The TDD carrier includes a plurality of subframes. The processor is configured by the executable code to determine a delay for a control information transmission to be transmitted by the apparatus. The delay corresponds to an amount of time available for the apparatus to process a data packet of a first subframe prior to transmitting the control information transmission in a second subframe. The apparatus is further configured to transmit the control information to the subordinate entity during the second subframe in accordance with the delay.

Another aspects of the present disclosure provides an apparatus for wireless communication. The apparatus includes a communication interface, a memory stored with executable code, and a processor operatively coupled to the communication interface and memory. The communication interface is configured to communicate with a set of one or more subordinate entities utilizing a TDD carrier in a synchronous network. The TDD carrier includes a plurality of subframes. The processor is configured by the executable code to determine a delay for a subordinate entity to apply a grant or assignment of resources. The delay corresponds to an amount of time available for the subordinate entity to process the grant or assignment prior to configuring a transceiver to utilize the granted or assigned resources. The processor is further configured to transmit the determined delay to the subordinate entity utilizing a control channel transmission. The processor is further configured to transmit the grant or assignment of resources to the subordinate entity during a first subframe, and communicate with the subordinate entity utilizing the granted or assigned resources during a second subframe in accordance with the delay.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
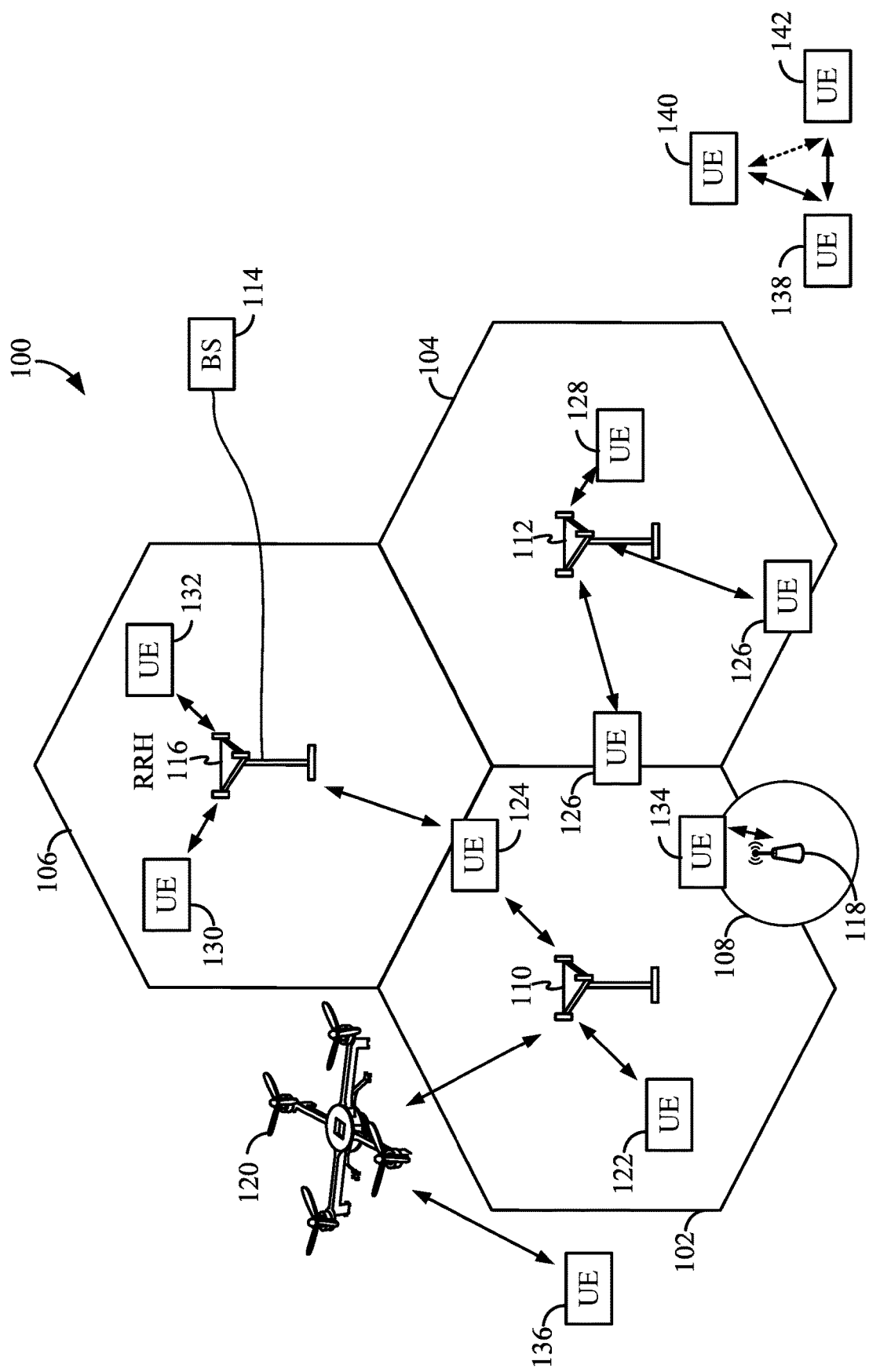
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Various aspects of the disclosure provide for apparatus, methods, and software for implementing certain configurable delays to relax processing timelines when needed in a time division duplex (TDD) wireless communication system. By implementing these configurable delays, very high data rates may be accommodated at the same time as lower data rates for devices that may have reduced or lesser processing capabilities. In various aspects of the disclosure, the time until processing and/or transmission of a data packet to configure a physical layer ACK feedback transmission may be delayed by a configurable amount of time. In further aspects of the disclosure, the time until a base station determines scheduling for devices based on control information received from those devices may be delayed or extended by a configurable amount of time. In still further aspects of the disclosure, the time until a device processes a scheduling grant or an assignment of scheduled resources may be delayed or extended by a configurable amount of time.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

The various concepts presented throughout this disclosure may be implemented across a broad variety of telecommunication systems, network architectures, and communication standards. For example, the 3GPP defines several wireless communication standards for networks including the evolved packet system (EPS), frequently referred to as long-term evolution (LTE) networks. LTE networks can provide end-to-end latency between a transmitting device and a receiving device on the order of 50 ms, with over-the-air latency for a particular packet being in the range of 10 ms. Currently known LTE functionality provides for a round trip time (RTT) for certain feedback signaling (i.e., hybrid automatic repeat request (HARQ) signaling) of at least about 8 ms, using a transmission time interval (TTI) of 1 ms. Here, a TTI may correspond to a minimum duration for a unit of information that can independently be decoded.

Next generation networks going forward, such as a fifth-generation (5G) network, may provide for many different types of services or applications, including but not limited to web browsing, video streaming, VoIP, mission critical applications, multi-hop networks, remote operations with real-time feedback (e.g., tele-surgery or automated driving), etc. In many of these applications, improvements that can reduce latency in the processing and return of feedback transmissions are highly desirable.

Referring now to FIG. 1, as an illustrative example without limitation, a simplified schematic illustration of an access network 100 is provided. The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell. The access network 100 may be a synchronous network.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a consumer and/or wearable device, such as eyewear, a wearable camera, a smart watch, a health or fitness tracker, a digital audio player (e.g., MP3 player), a camera, a game console, etc. An IoT device may additionally be a digital home or smart home device such as a home audio, video, and/or multimedia device, an appliance, a sensor, a vending machine, intelligent lighting, a home security system, a smart meter, etc. A mobile apparatus may additionally be a smart energy or security device, a solar panel or solar array, municipal lighting, water, or other infrastructure; industrial automation and enterprise device, etc. Still further, a mobile apparatus may provide for telemedicine support, or health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes. In some examples, the devices of the access network 100 may utilize multiple-input multiple-output (MIMO) antenna technology.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
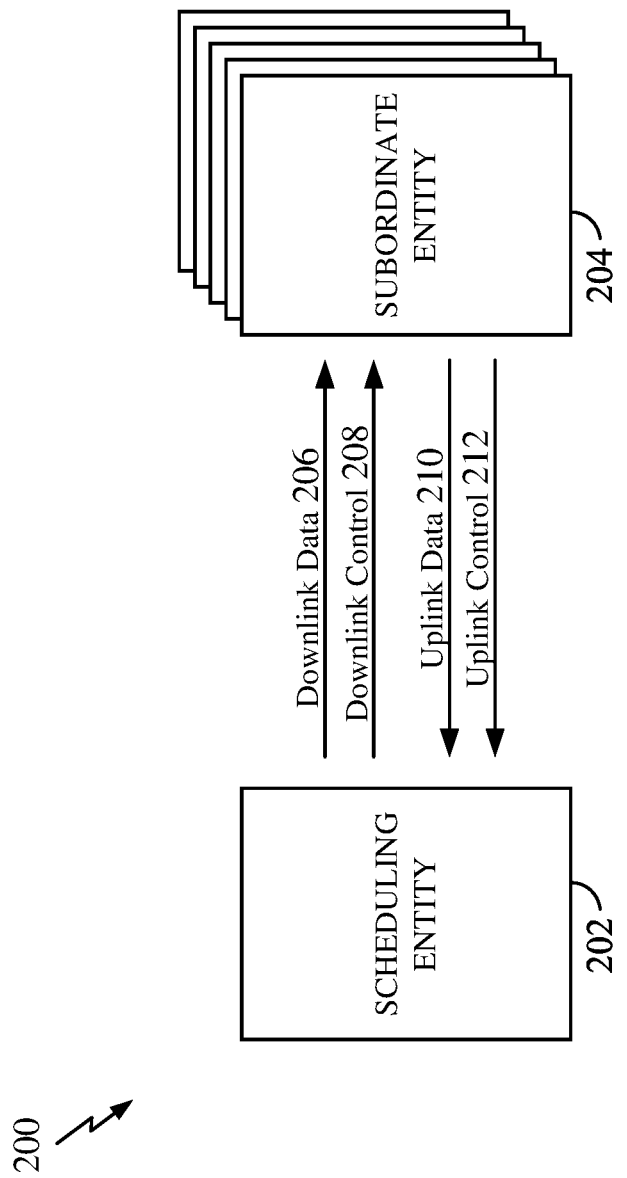
FIG. 2 is a block diagram conceptually illustrating an example of a scheduling entity communicating with one or more subordinate entities according to some aspects of the disclosure.

Referring now to FIG. 2, a block diagram illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

In some aspects of the disclosure, the scheduling entity 202 and the subordinate entities 204 may communicate with each other utilizing TDD subframes including for example uplink (UL)-centric subframes and downlink (DL)-centric subframes. Examples of UL-centric and DL-centric subframes are described in more detail in relation to FIGS. 5-8, 10, 12, and 14. In some examples, the subframes may be self-contained subframes.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
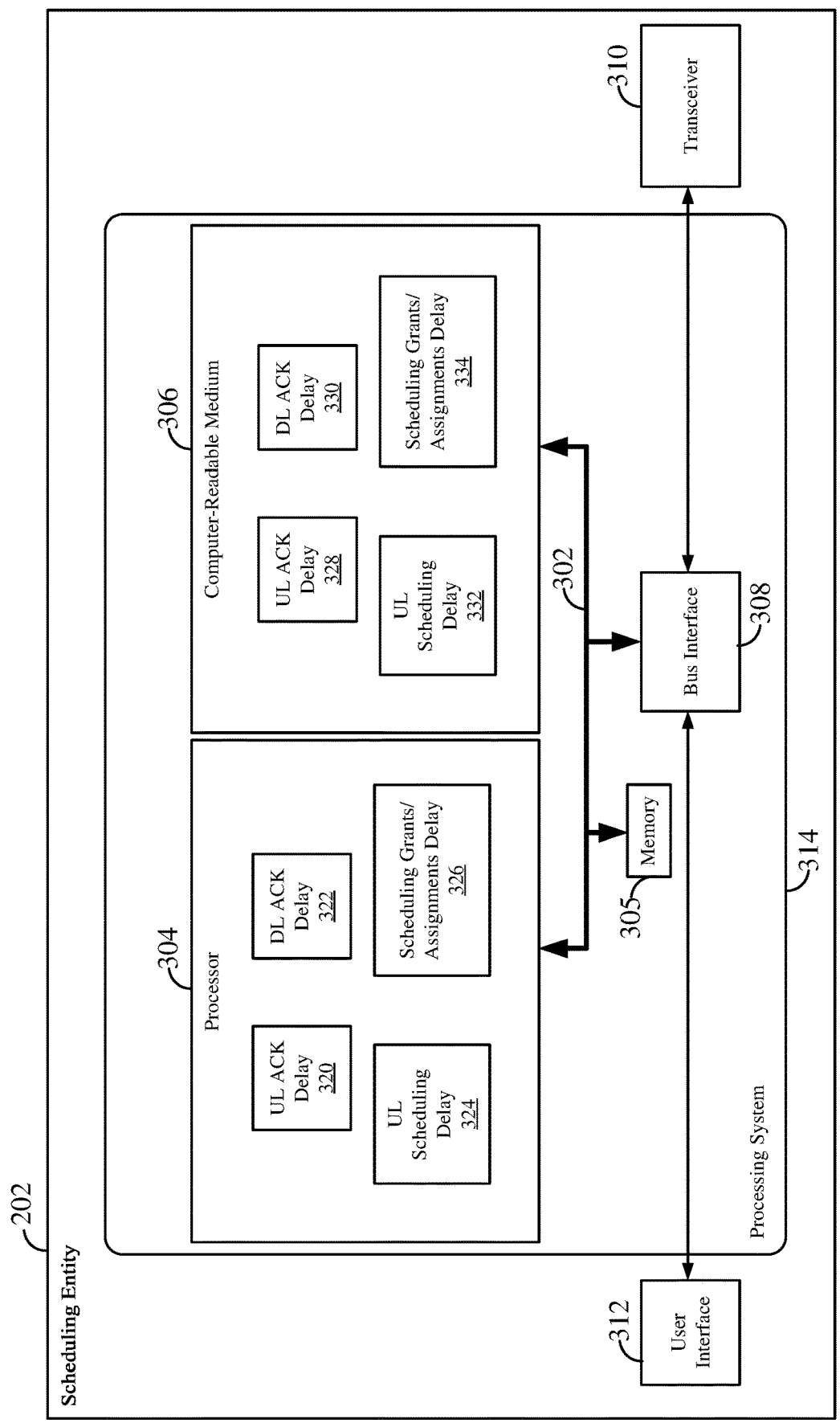
FIG. 3 is a block diagram illustrating an example of a hardware implementation for a scheduling entity employing a processing system according to some aspects of the disclosure.

FIG. 3 is a conceptual diagram illustrating an example of a hardware implementation for an exemplary scheduling entity 202 employing a processing system 314. In accordance with various aspects of the disclosure, an element, or any portion of an element, or any combination of elements may be implemented with a processing system 314 that includes one or more processors 304.

In various aspects of the disclosure, the scheduling entity 202 may be any suitable radio transceiver apparatus, and in some examples, may be embodied in a base station (BS), a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. A base station may provide wireless access points to a core network for any number of user equipment (UE). Throughout the present disclosure, for ease of reference, the LTE terminology of eNB may be utilized interchangeably with base station or scheduling entity. However, in an actual network, the terminology may change, especially in non-LTE networks, and continue to fall within the scope of this disclosure.

In other examples, the scheduling entity 202 may be embodied in a wireless UE. Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc.), an appliance, a sensor, a vending machine, an Internet of Things (IoT) device, an M2M/D2D device, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 304, as utilized in a scheduling entity 202, may be used to implement any one or more of the processes described below for example in FIGS. 8-15.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310 (a communication interface). The transceiver 310 provides a means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include various functional blocks and/or circuitry that can be configured to perform the various functions and processes described throughput this disclosure, for example, in FIGS. 8-15. In one example, the processor 304 may include an UL ACK delay block 320, a DL ACK delay block 322, a scheduling delay block 324, and a scheduling grant/assignment delay block 326. The UL ACK delay block 320 may be configured by an UL ACK delay code 328 to determine a delay for an UL ACK feedback for a certain subordinate entity. The DL ACK delay block 322 may be configured by a DL ACK delay code 330 to determine a delay for a DL ACK feedback for a certain subordinate entity. The scheduling delay block 324 may be configured by a scheduling delay code 332 to determine a delay for transmitting scheduling information to a certain subordinate entity. The scheduling grant/assignment delay block 326 may be configured by a scheduling grant/assignment delay code 334 to determine a delay for a subordinate entity to apply or utilize grants or assignments of scheduled resources. The processor 304 may utilize the transceiver 310 to transmit the determined delays to the corresponding subordinate entities.

The processor 304 is responsible for managing the bus 302 and general processing, including the execution of software stored on the computer-readable medium 306. The software may include the UL ACK delay code 328, DL ACK delay code 330, scheduling delay code 332, and scheduling grant/assignment delay code 334. The software, when executed by the processor 304, causes the processing system 314 to perform the various functions described below for any particular apparatus. The computer-readable medium 306 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
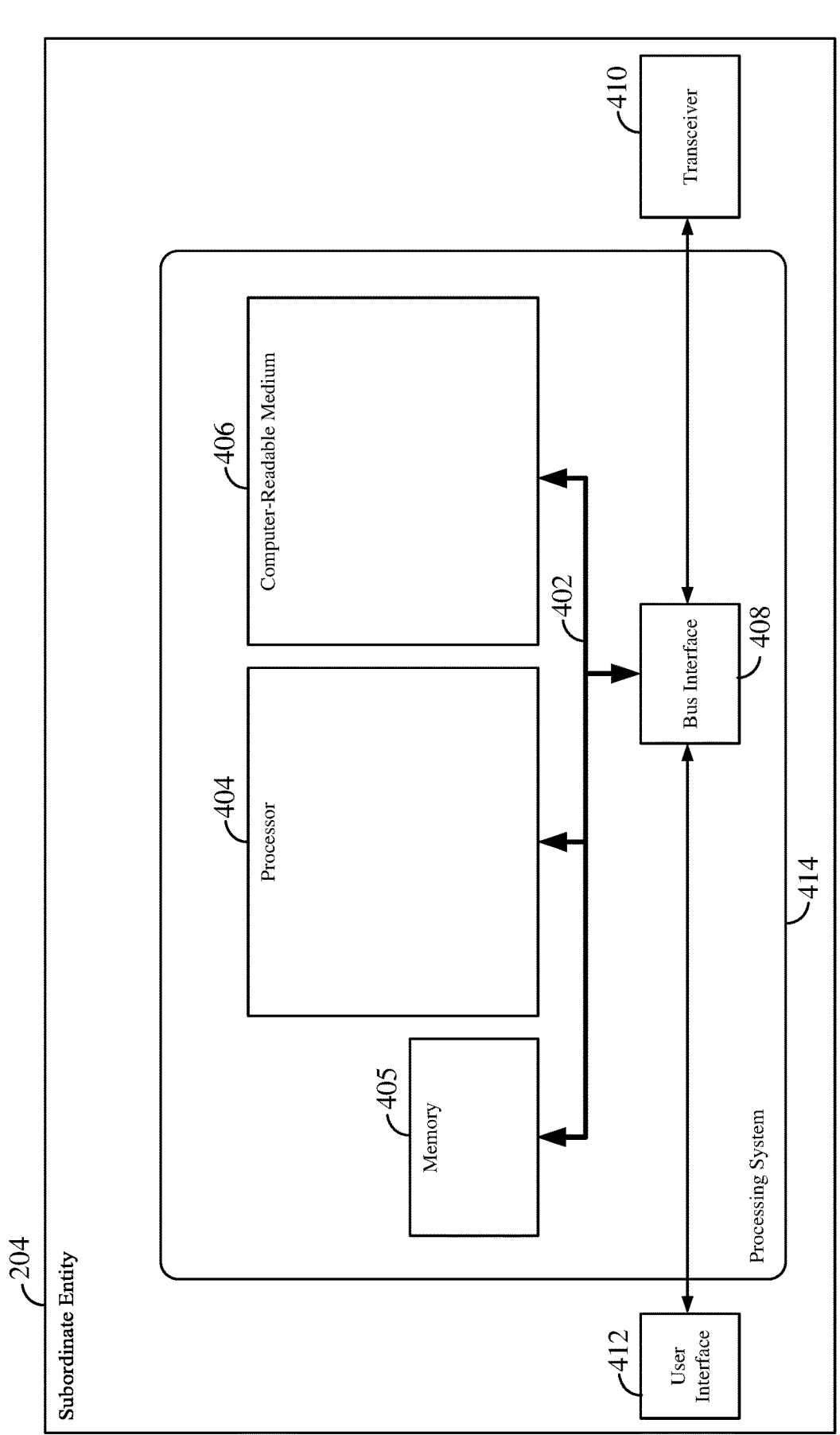
FIG. 4 is a block diagram illustrating an example of a hardware implementation for a subordinate entity employing a processing system according to some aspects of the disclosure.

FIG. 4 is a conceptual diagram illustrating an example of a hardware implementation for an exemplary subordinate entity 204 employing a processing system 414. In accordance with various aspects of the disclosure, an element, or any portion of an element, or any combination of elements may be implemented with a processing system 414 that includes one or more processors 404.

The processing system 414 may be substantially the same as the processing system 314 illustrated in FIG. 3, including a bus interface 408, a bus 402, memory 405, a processor 404, and a computer-readable medium 406. Furthermore, the subordinate entity 204 may include a user interface 412 and a transceiver 410 (a communication interface) substantially similar to those described above in FIG. 3. In some aspects of the disclosure, the processor 404 may be configured, for example by software stored in the computer-readable medium 406, to perform the functions and processes described in relation to FIGS. 8-15 of the present disclosure.

In any wireless communication network, bi-directional communication is a desirable feature. Frequently, duplexing communication onto the air channel is accomplished utilizing frequency division duplex (FDD) or time division duplex (TDD). In FDD, a pair of carriers is used, with each respective carrier being used to carry communication signals in a different direction. In TDD, unpaired carriers are used. Here, duplexing of uplink and downlink communication is achieved by time-sharing the carrier, with uplink and downlink communication occupying the carrier at different times.

In many modern wireless communication networks, significant portions of the spectrum have been allocated out by regulatory agencies in paired carriers for 1-DD. For new developing technologies, if very high bandwidth communication is desired (e.g., 100 MHz, 300 MHz, or more), however, these FDD technologies already utilize much of the spectrum, and may not be as wideband as desired for much higher data rates. At higher frequencies, including but not limited to millimeter wave (mmW) frequencies, TDD carriers may be more available. Furthermore, such TDD carriers may be less expensive for a carrier to obtain rights to use.

Figure 5:
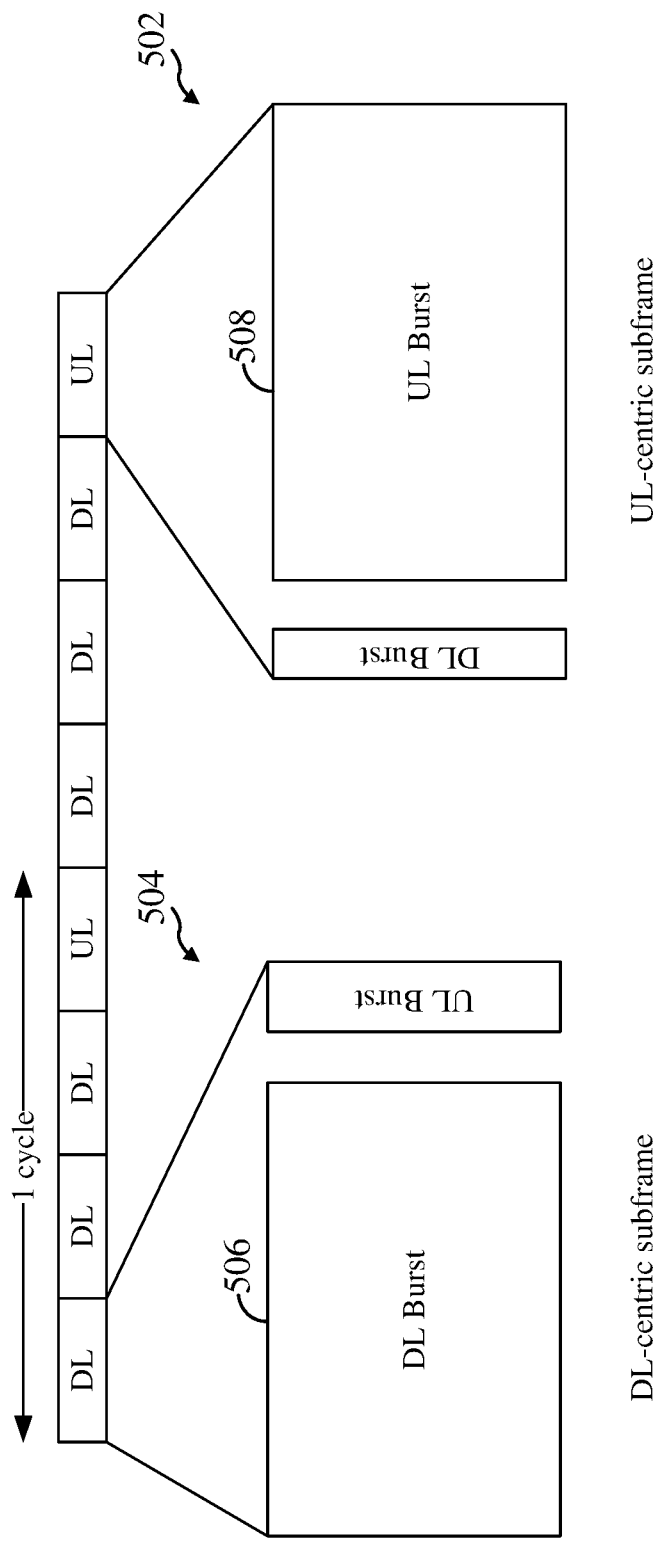
FIG. 5 illustrates the structure of uplink- and downlink-centric subframes that may be used in some access networks.

As illustrated in FIG. 5, when utilizing a TDD carrier, communication may in some examples be organized by dividing the channel in the time domain into frames, with frames being further divided into subframes. According to an aspect of the present disclosure, subframes may take at least two general forms, referred to herein as an uplink (UL)-centric subframe structure 502 and a downlink (DL)-centric subframe structure 504. Here, a DL-centric subframe is a subframe where a majority of its time is used for communication in the downlink direction (e.g., shown as DL burst 506 in FIG. 5); and an UL-centric subframe is a subframe where a majority of its time is used for communication in the uplink direction (e.g., shown as UL burst 508 in FIG. 5).

In a typical cell deployment, there may be an asymmetry between downlink traffic and uplink traffic. In general, a network has a greater amount of downlink traffic, and accordingly, a greater number of DL-centric subframes, may appear. Furthermore, even while this imbalance may be predictable, the actual ratio between UL-centric subframes and DL-centric subframes may not be predictable, and may vary over time. In the example of FIG. 5, the ratio is three DL-centric subframes to one UL-centric subframe for a certain cycle. However, other ratios are possible.

This combination of an imbalance, and unpredictability of its exact measure, can cause issues in conventional TDD frame/subframe structures. Specifically, if a UE or subordinate entity has data that it wishes to transmit over the uplink, the UE must wait for an uplink transmission opportunity. With this subframe structure, the time when such an uplink transmission opportunity may occur can vary, and can be unpredictable. In many cases, the time may be quite long, resulting in significant latency. This latency can be particularly problematic when the information that the UE wishes to transmit over the uplink is control feedback, which can in many cases be time-sensitive or mission-critical.

This unpredictable latency can be at least partially alleviated by utilizing a subframe structure that presents reasonable uplink transmission opportunities in every subframe. Accordingly, in some aspects of the present disclosure, TDD subframes may be structured as self-contained subframes.

Figure 6:
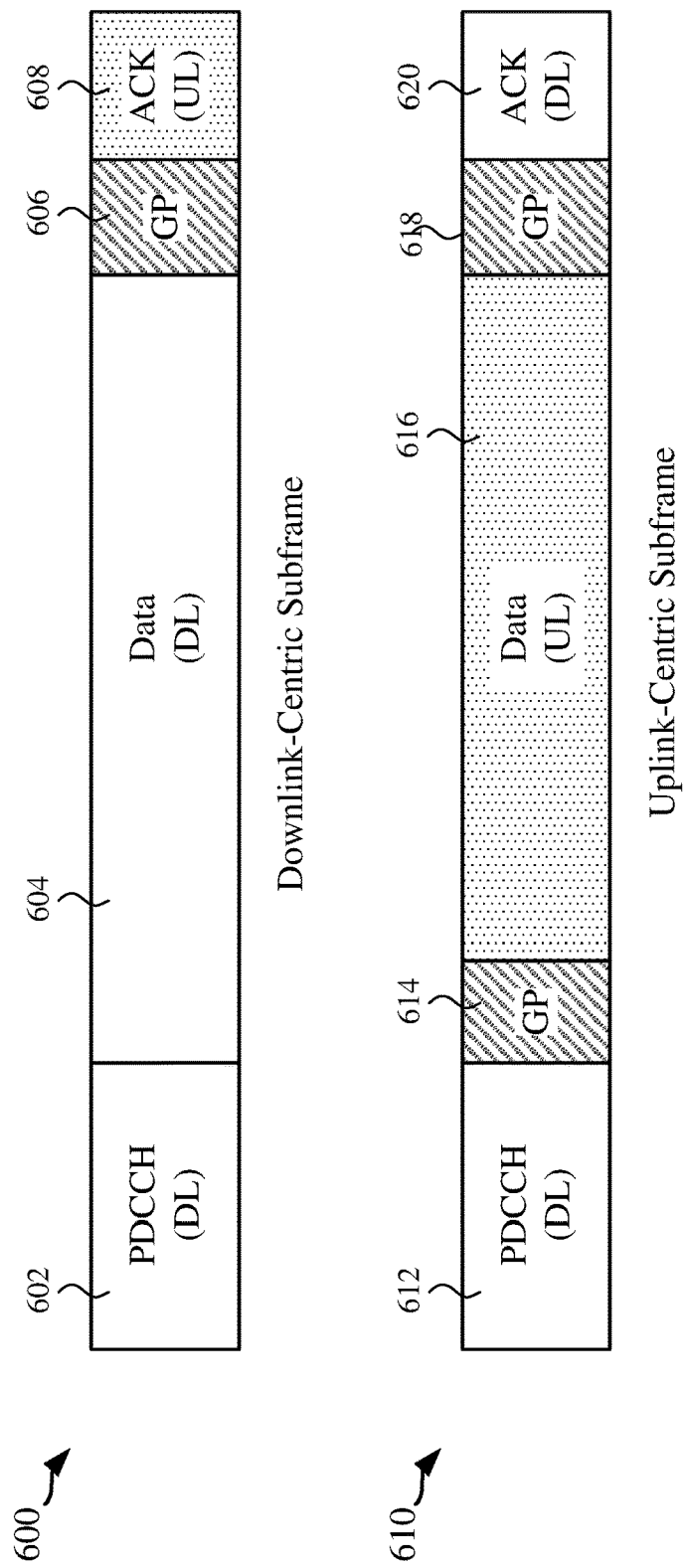
FIG. 6 illustrates the structure of some examples of self-contained subframes that may be used in some access networks.

FIG. 6 illustrates exemplary structures of self-contained subframes 600 and 610.

Broadly, a self-contained subframe is one in which the scheduling, the data transmission, and the data acknowledgment are grouped together into a single self-contained unit or subframe, and may be independent of any other subframes. For example, referring to the DL-centric subframe 600, all of the data in the data portion 604 may be scheduled utilizing scheduling information or grants in the control region 602; and further, all of the data in the data portion 604 may be acknowledged (or negatively acknowledged) in the ACK portion 608. Similarly, for the uplink-centric subframe 610, all of the data in the data portion 616 may be scheduled utilizing scheduling information or grants in the control region 612; and further, all of the data in the data portion 616 may be acknowledged (or negatively acknowledged) in the ACK portion 620.

In further detail, a transmitter-scheduled subframe, referred to herein as a downlink TTI subframe or DL-centric subframe 600, may be used to carry control, data, and/or scheduling information to one or more subordinate entities, which may be UEs for example. A receiver-scheduled subframe, referred to herein as an uplink TTI subframe or UL-centric subframe 610, may be used to receive control data from the scheduling entity, transmit data to a scheduling entity, and receive an ACK/NACK signal for the transmitted data.

In the context of a multiple access network, channel resources are generally scheduled, and each entity is synchronous in time. That is, each node utilizing the network coordinates its usage of the resources such that transmissions are only made during the allocated portion of the frame, and the time of each allocated portion is synchronized among the different nodes or network devices. One node acts as a scheduling entity, and one or more nodes may be subordinate entities. The scheduling entity may be a base station or access point, or a UE in a device-to-device (D2D), P2P, and/or mesh network. The scheduling entity manages the resources on the carrier and assigns resources to other users of the channel or carrier, including subordinate or scheduled entities, such as one or more UEs in a cellular network.

Each subframe is divided into transmit (Tx) and receive (Rx) portions. In the DL-centric subframe 600, the scheduling entity first has an opportunity to transmit control information in the control information portion 602, and then an opportunity to transmit data in the DL data portion 604. The Tx portions 602 and 604 carry DL bursts in this case. Following a guard period (GP) portion 606, the scheduling entity has an opportunity to receive an acknowledged (ACK)/not acknowledged (NACK) signal or feedback in the ACK/NACK portion 608 from other entities using the carrier. The ACK/NACK portion 608 carries an UL burst. This frame structure is downlink-centric, as more resources are allocated for transmissions in the downlink direction (e.g., transmissions from the scheduling entity).

In one example, the control information portion 602 may be used to transmit a physical downlink control channel (PDCCH) and the DL data portion 604 may be used to transmit a DL data payload. Following the GP portion 606, the scheduling entity may receive an ACK signal (or a NACK signal) from the scheduled entity or subordinate entity during the ACK/NACK portion 608 to indicate whether the data payload was successfully received. The GP portion 606 may be scheduled to accommodate variability in UL and DL timing. For example, latencies due to RF antenna and/or circuitry direction switching (e.g., from DL to UL) and transmission path latencies may cause the subordinate entity to transmit early on the UL to match DL timing. Such early transmission may interfere with symbols received from the scheduling entity. Accordingly, the GP portion 606 may allow an amount of time after the DL data portion 604 to prevent or reduce interference, where the GP portion 606 may provide an appropriate amount of time for the scheduling entity to switch its RF antenna/circuitry direction, for the over-the-air (OTA) transmission time, and time for ACK processing by the subordinate entity. Accordingly, the GP portion 606 may provide an appropriate amount of time for the subordinate entity to switch its RF antenna/circuitry direction (e.g., from DL to UL), to process the data payload, and for the over-the-air (OTA) transmission time. The duration of the GP portion 606 may be configured in terms of symbol periods. For example, the GP portion 606 may have a duration of one symbol period (e.g., 31.25 μs) or multiple symbol periods. This frame structure is downlink-centric, as more resources are allocated for transmissions in the downlink direction (e.g., transmissions from the scheduling entity).

In the UL-centric subframe 610, the subordinate entity first has an opportunity to receive control information in the control information portion 612 (DL portion). Following a GP portion 614, the subordinate entity has an opportunity to transmit data in the UL data portion 616. Following another GP portion 618, the subordinate entity subsequently has an opportunity to receive an ACK/NACK signal in the ACK/NACK portion 620 (DL portion) from the scheduling entity using the carrier. This frame structure is uplink-centric, as more resources are allocated for transmissions in the uplink direction (e.g., transmissions from the subordinate entity).

Figure 7:
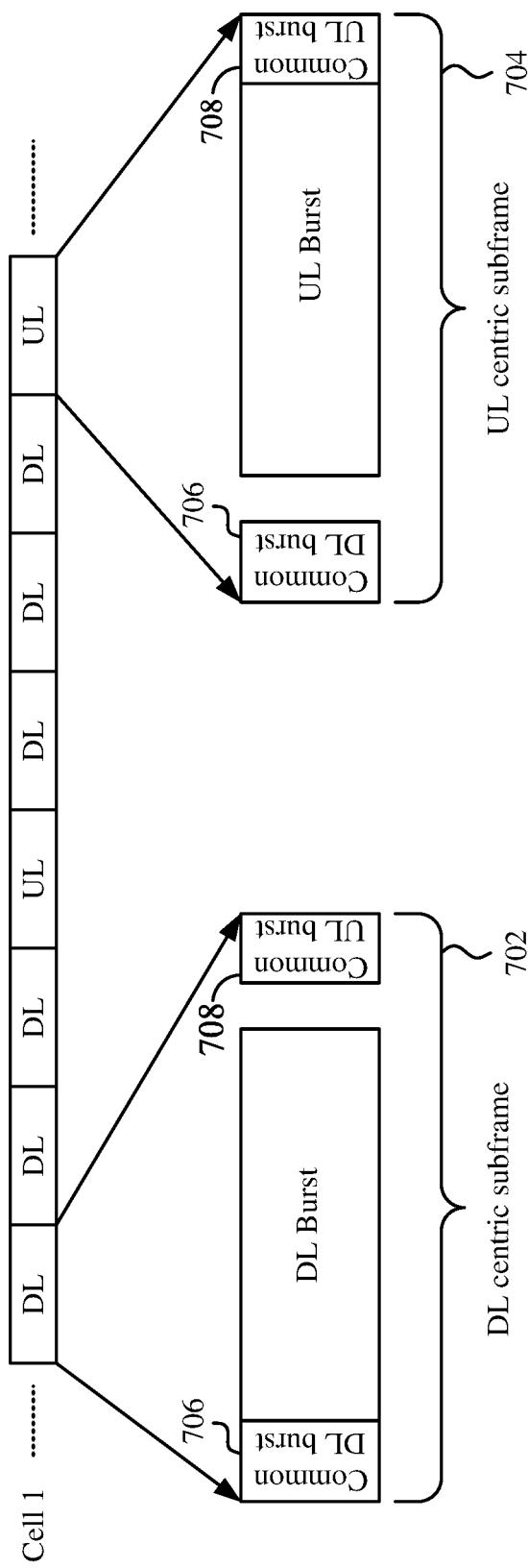
FIG. 7 illustrates the structure of subframes including common bursts according to some aspects of the disclosure.

In a further aspect of the disclosure, to further alleviate potential latency that may otherwise result from devices needing to wait for transmission opportunities in the subframe structure being used, certain common bursts may appear in any given subframe (e.g., in every subframe). FIG. 7 is a schematic diagram illustrating common DL bursts and common UL bursts as they may appear in each of a DL-centric subframe 702 and an UL-centric subframe 704. In the illustrated example, the common DL bursts 706 occur at the beginning of each subframe, and the common UL bursts 708 occur at the end of each subframe. However, this is not necessarily the case, and within the scope of the present disclosure, such common UL and DL bursts may appear anywhere within each respective subframe.

In some aspects of the disclosure, all common DL bursts 706 within any given subframe (whether an UL-centric subframe or a DL-centric subframe) may be structured the same; and similarly, all common UL bursts 708 within any given subframe (whether an UL-centric subframe or a DL-centric subframe) may be structured the same.

While these common bursts may carry any suitable information, in some examples, the common DL burst may be utilized to carry control information transmitted by the scheduling entity, including but not limited to scheduling information for either the UL or DL (or both); or physical layer acknowledgment (ACK) transmissions. Further, the common UL burst may be utilized to carry control information transmitted by the UE or subordinate entity, including but not limited to a sounding reference signal (SRS), a physical layer ACK or NACK, a scheduling request (SR), channel quality information (CQI), etc.

By utilizing these common UL and DL bursts, latency may be reduced for mission-critical packets such as control information and feedback, to the duration of, for example, a single subframe. However, according to various aspects of the present disclosure, the possibility for this latency or delay to be controlled, allows different delays or latencies to be provided. That is, by virtue of the presence of the common DL burst 706 and common UL burst 708 in every subframe, the UE and scheduling entity may be enabled to send the control information carried on these common bursts with a configurable delay, which may be independent of the UL/DL ratio, or the nature of the particular subframe currently occupying the channel (either DL-centric or UL-centric). Furthermore, in further aspects of the disclosure, UEs or subordinate entities with different delays may be multiplexed onto the channel, and may share these resources while still maintaining control over their respective delays.

Physical Layer ACK Feedback with Configurable Delay

According to an aspect of the present disclosure, a physical layer ACK may be transmitted in a common burst utilizing a variable (e.g., controllable or configurable) delay. Control of the delay can provide performance optimizations for a variety of different purposes, as described below.

Here, the physical layer ACK may be an uplink ACK or a downlink ACK. The uplink ACK is transmitted on an uplink channel (e.g., within the common UL burst) in order to acknowledge received downlink data; and the downlink ACK is transmitted on a downlink channel (e.g., within the common DL burst) in order to acknowledge received uplink data.

With regard to the uplink ACK, a UE or subordinate entity may configure transmission of the physical layer ACK with no delay or with a certain delay. Here, configuring the physical layer ACK with no delay may refer to the transmission of the ACK within the subframe (e.g., the self-contained subframe). For example, referring to the DL-centric subframe 702 seen in FIG. 7, a downlink packet received in the DL burst (e.g., on the PDSCH; or in some examples, a packet sent in the common DL burst) may be acknowledged by transmitting a physical layer ACK in the common UL burst 708 within the same subframe.

Configuring the physical layer ACK with delay may refer to the transmission of the ACK in a later subframe. Here, the delay until the transmission of the ACK may encompass one subframe, or any number of subframes. By delaying the transmission of the ACK, the UE's processing timeline may be relaxed or extended. That is, in an aspect of the disclosure, the UE may be configured to process a received downlink packet, e.g., by decoding the packet and in some examples calculating an error correction code such as a cyclic redundancy check (CRC) to determine whether the physical layer ACK transmission should be an ACK or a NACK. With very high data rates, it may occur that the processing timeline for a UE to process a received packet and determine the appropriate physical layer ACK to transmit may become a burden, and processing resources may be inadequate, or it may be desired to reduce the processing power at a given time. In another example, poor channel conditions may prompt additional buffering or other processing at a device, and extending the delay before ACK transmission may be desirable. Accordingly, by extending the delay to one or more later subframes until the transmission of the ACK, relaxation or extension of the processing timeline can be achieved. Moreover, by utilizing a subframe structure that includes the common UL burst portion in each subframe, the configurable delay for an ACK feedback can be configured to any integer number of subframes for the delay.

Figure 8:
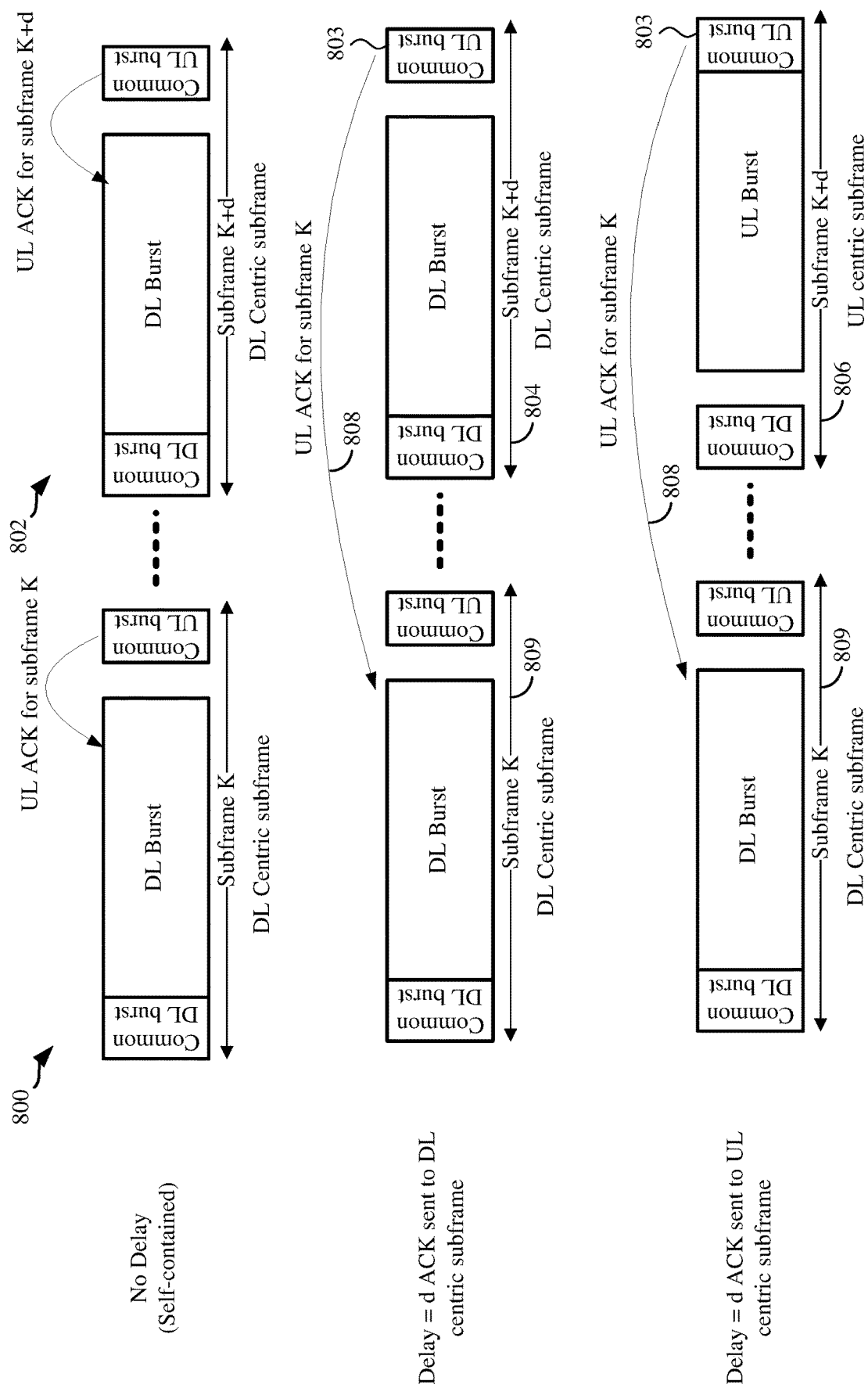
FIG. 8 is a diagram illustrating examples of a TDD frame structure implementing delayed uplink ACKs according to some aspects of the disclosure.

FIG. 8 provides three examples of different delays for uplink ACK transmissions as they may be implemented according to some aspects of the present disclosure. Here, a "no-delay" example corresponding to self-contained subframes illustrates two DL-centric subframes 800 and 802, labeled subframe K and subframe K+d. As illustrated, each of the subframes 800 and 802 includes an ACK within the common UL burst region, with each respective ACK corresponding to a data packet carried on the DL burst region of that same subframe.

Two delay=d examples illustrate how an uplink ACK may be transmitted in the common UL burst portion 803 of either a DL-centric subframe 804 or an UL-centric subframe 806. In both of these examples, the uplink ACK 808 transmitted in subframe K+d includes an ACK or NACK corresponding to a data packet carried on the DL burst region of subframe K 809.

Figure 9:
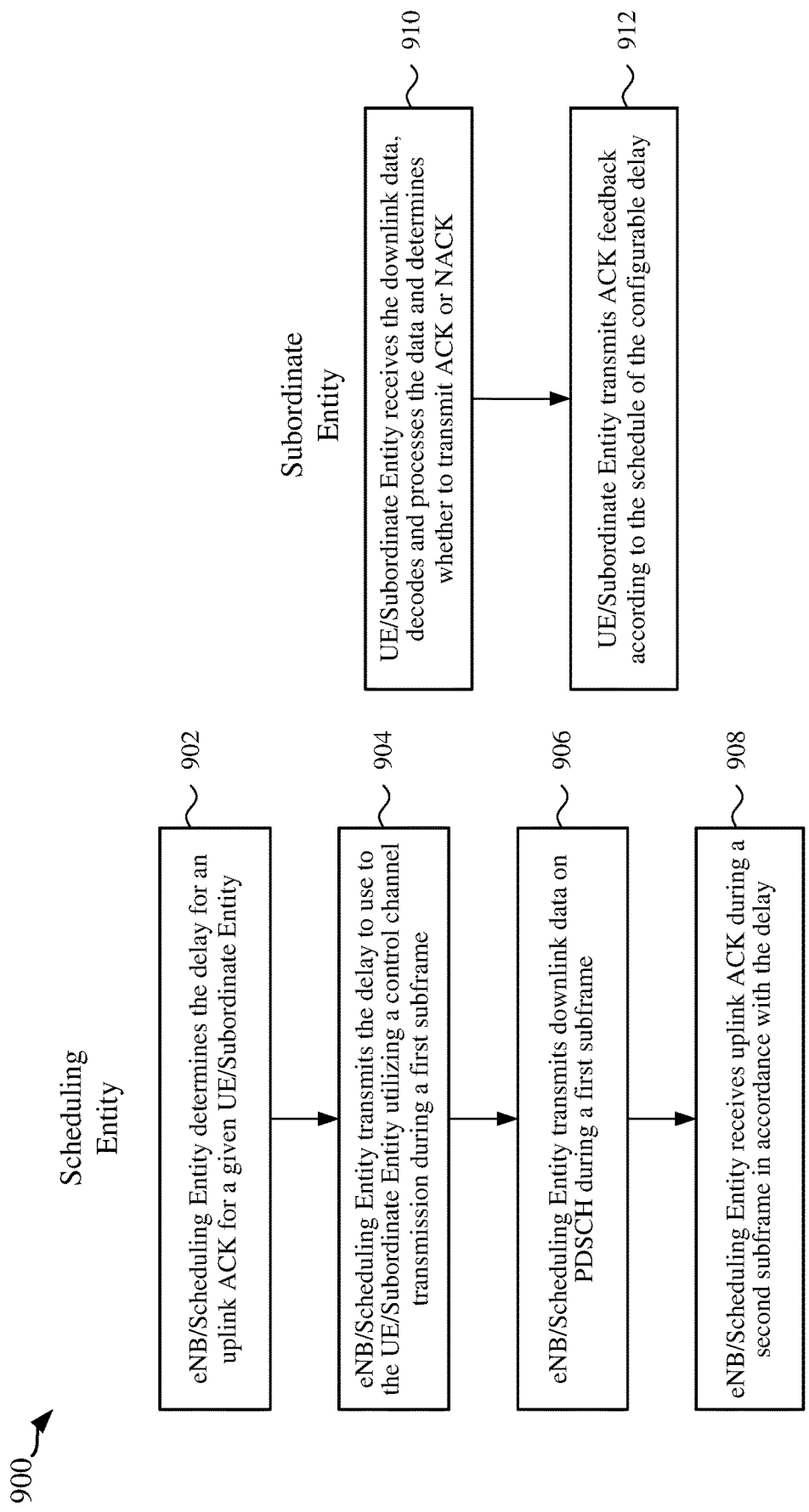
FIG. 9 is a flow chart illustrating an example of a process for implementing delayed uplink ACKs according to some aspects of the disclosure.

FIG. 9 is a flow chart illustrating an exemplary process 900 corresponding to a configurable delay for ACK feedback (i.e., an UL ACK) in wireless communication according to some aspects of the present disclosure, as described above and illustrated in FIG. 8. The process of FIG. 9 may be performed using any of the scheduling entities and subordinate entities illustrated in FIGS. 1-4 or other wireless communication devices. For example, in the process of FIG. 9, a scheduling entity 202 may communicate with a set of one or more subordinate entities 204 utilizing a TDD carrier that includes a plurality of self-contained subframes.

At block 902, a scheduling entity (e.g., eNB) may utilize an UL ACK delay block 320 (see FIG. 3) to determine a delay for an uplink acknowledgment (ACK) transmission to be transmitted by a subordinate entity (e.g., UE). The delay corresponds to an amount of time available for the subordinate entity to process a downlink data packet prior to transmitting the uplink ACK. For example, the delay may be any of the delays illustrated and described in relation to FIG. 8. The delay is configurable per subframe. For example, the delay may be different for different subframes and/or different subordinate entities. In some examples, the delay may be determined such that the subordinate entity may transmit the uplink ACK in a subframe different from a subframe for receiving the configurable delay from the scheduling entity.

At block 904, the scheduling entity transmits the determined delay to the subordinate entity utilizing a control channel transmission during a first subframe. For example, the control channel may be a PDCCH or common DL burst of a subframe K of FIG. 8. In some examples, the scheduling entity may transmit different delays to different subordinate entities in the same common DL burst using a certain multiplexing scheme (e.g., FDM). At block 906, the scheduling entity transmits the downlink data packet to the subordinate entity during the first subframe. For example, the scheduling entity may transmit one or more downlink data packets in a PDSCH or DL burst of the subframe K of FIG. 8. At block 908, the scheduling entity receives the uplink ACK from the subordinate entity during a second subframe in accordance with the delay. For example, the second subframe may be the subframe K+d of FIG. 8. In some aspects of the disclosure, the first subframe is a DL-centric subframes, and the second subframe may be a DL- or UL-centric subframe. In some examples, the first subframe and the second subframe may be adjacent subframes or separated by one or more subframes.

Still referring to FIG. 9, at block 910, a subordinate entity receives the downlink data packet, decodes and processes the data, and determines whether to transmit an UL ACK feedback (ACK or NACK) to the scheduling entity. A block 912, the subordinate entity transmits the ACK feedback according to the schedule of the configurable delay. Depending on the configurable delay, the subordinate entity may transmit the ACK feedback in a subframe (e.g., subframe K-d of FIG. 8) later in time than the subframe (e.g., subframe K of FIG. 8) for receiving the delay from the scheduling entity.

With regard to the downlink ACK, a scheduling entity (e.g., eNB) may configure transmission of the physical layer ACK with no delay or with delay. In the examples illustrated in FIG. 7, where the common DL burst 706 is provided at the beginning of each subframe, a physical layer ACK transmitted in this common DL burst 706 would correspond to an UL transmission (e.g., on the PUSCH; or in some examples, a packet sent in the common UL burst) one or more subframes prior to the subframe that includes that common DL burst. However, as mentioned above, it is not necessarily the case that the common DL burst is arranged at the beginning of each subframe, and within the scope of the present disclosure, in a subframe that includes an UL portion prior to the common DL burst, same-subframe downlink ACK transmissions may be implemented. In any case, according to aspects of the present disclosure, the delay before transmission of the downlink ACK in the common DL burst may be configurable for (zero or) one or more subframes.

Similar to the case for the uplink ACK, providing for a configurable delay for transmission of the downlink ACK may provide for relaxed scheduling entity (e.g., eNB) processing timeline requirements. That is, for an eNB or scheduling entity at high data rates and/or reduced processing capabilities, a greater delay until transmission of the DL physical layer ACK may accommodate these reduced capabilities. Here, by utilizing a subframe structure that includes the common DL burst portion in each subframe, the configurable delay for DL ACK feedback can be configured to any integer number of subframes for the delay.

Figure 10:
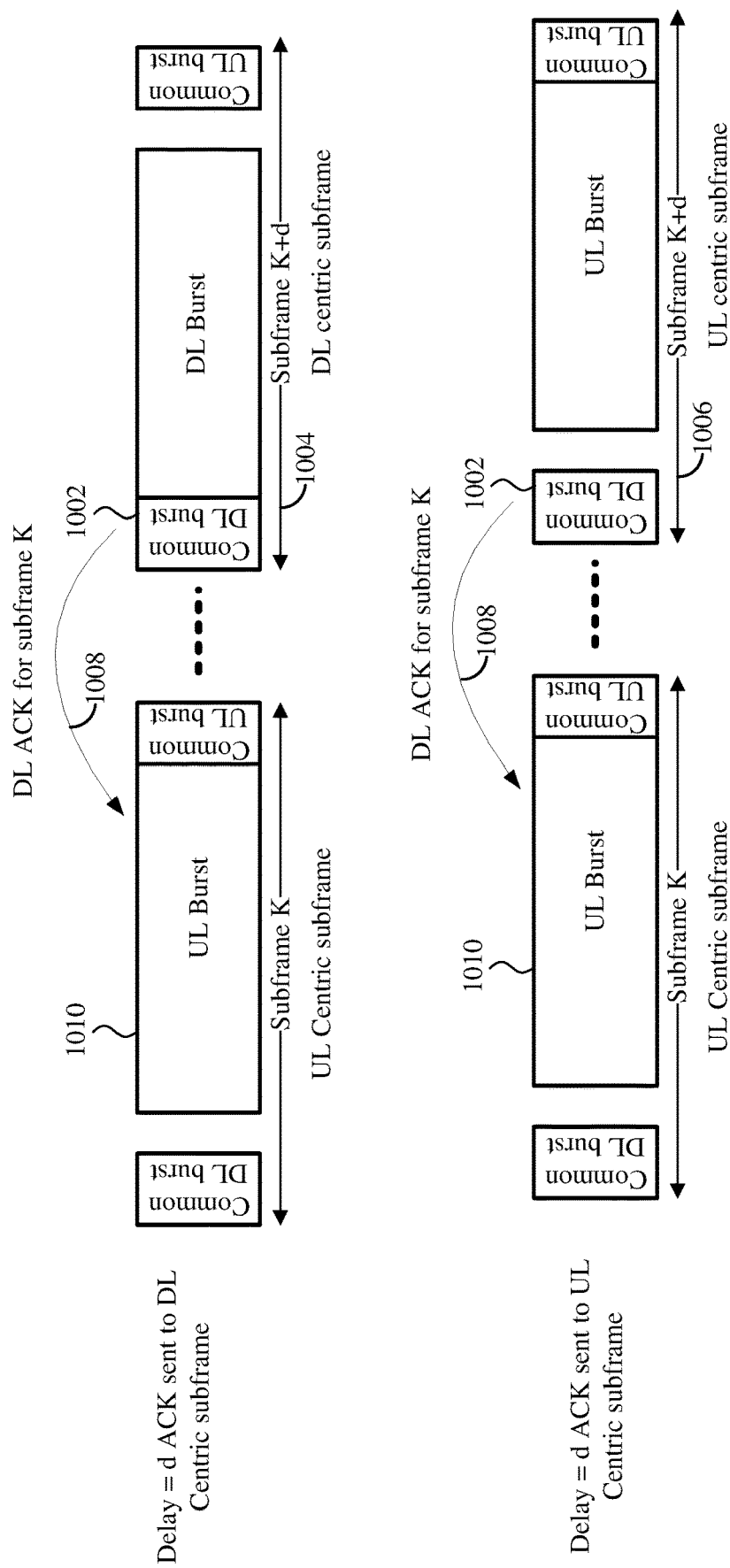
FIG. 10 is a diagram illustrating examples of a TDD frame structure implementing delayed downlink ACKs according to some aspects of the disclosure.

FIG. 10 provides two examples of different delays for downlink ACK transmissions as they may be implemented according to some aspects of the present disclosure. Here, both examples illustrate "delay=d" examples, wherein a downlink ACK may be transmitted in the common DL burst portion 1002 of either a DL-centric subframe 1004 or an UL-centric subframe 1006. In both of these examples, the downlink ACK transmitted 1008 in a subframe K+d includes an ACK/NACK corresponding to a data packet carried on the UL burst region 1010 of a subframe K. In one example, the subframe K+d may immediately follow the subframe K (i.e., zero subframe delay). In some examples, the subframe K+d may not immediately follow the subframe K, and one or more subframes may be between the subframe K and subframe K+d (e.g., one or more subframe delay).

In a further aspect of the disclosure, by virtue of the use of the common bursts, users having different feedback delays may be multiplexed together. For example, while some users may operate with a peak throughput, these users may be accommodated by configuring for an immediate (e.g., zero-subframe delay) feedback transmission. However, other users may operate with lower capabilities, or may be operational with a low throughput, and these users may transmit their ACK feedback later, e.g., with a one or more subframe delay. These users' transmissions may be multiplexed onto the common burst by utilizing any suitable multiplexing scheme, such as OFDM, with different time-frequency resources occupied by different users. Of course, other multiplexing schemes may be utilized within the scope of the present disclosure.

Furthermore, by providing for different and configurable delays for these UL and/or DL ACK transmissions, different bundling factors may be provided. That is, in an aspect of the present disclosure, different numbers of repetitions of ACK transmissions may be utilized by different devices, being facilitated by virtue of having different and configurable ACK transmission delays. In this way, range extension may be achieved by enabling multiple repetitions for distant devices that may suffer from a high path loss. Here, if for example an ACK delay of 3 subframes is configured, then the distant device may repeat its ACK transmission three times.

Figure 11:
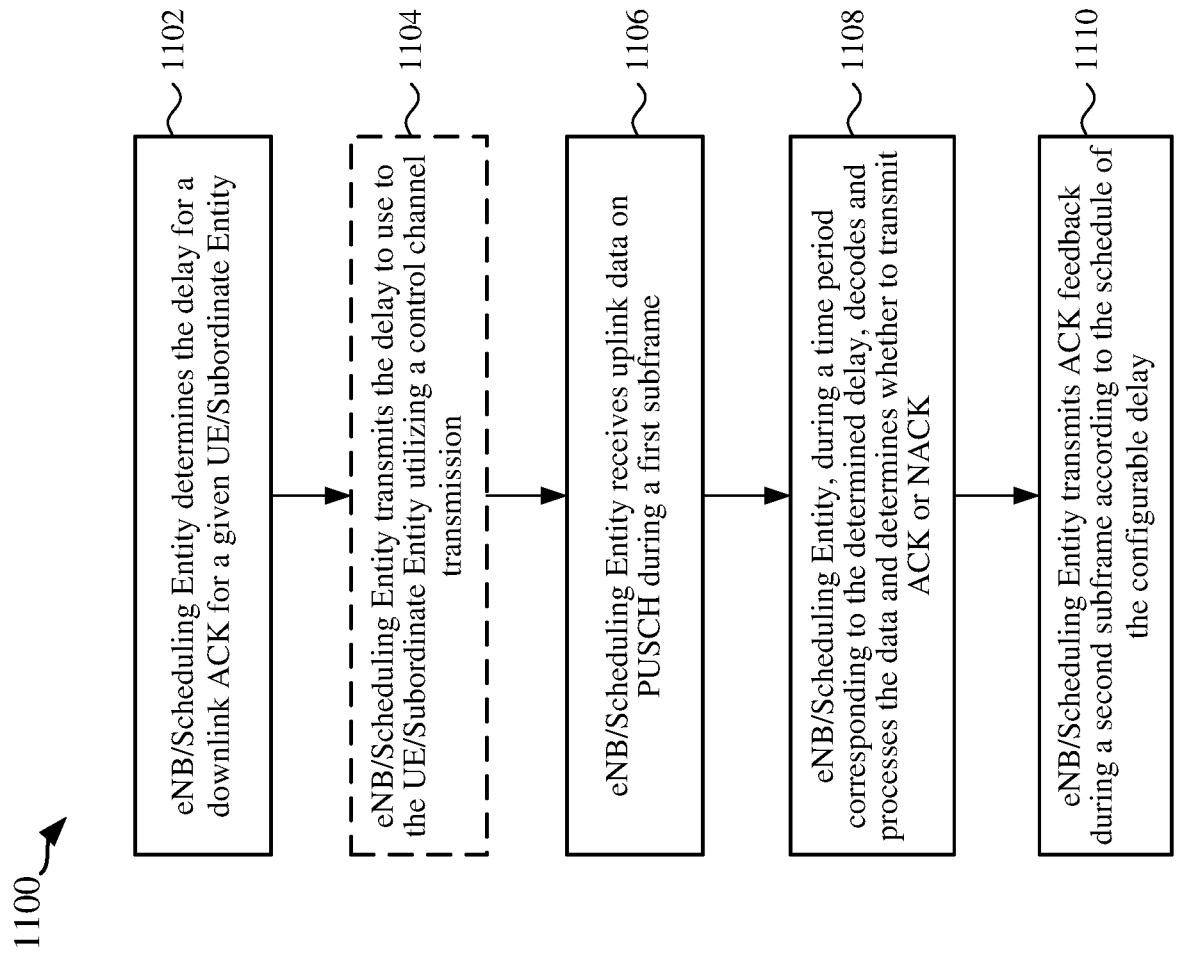
FIG. 11 is a flow chart illustrating an example of a process for implementing delayed downlink ACKs according to some aspects of the disclosure.

FIG. 11 is a flow chart illustrating an exemplary process 1100 corresponding to a configurable delay for ACK feedback (i.e., a DL ACK) according to some aspects of the present disclosure, as described above and illustrated in FIG. 10. The process of FIG. 11 may be performed using any of the scheduling entities and subordinate entities illustrated in FIGS. 1-4 or other wireless communication devices. For example, in the process of FIG. 11, a scheduling entity 202 may communicate with a set of one or more subordinate entities 204 utilizing a TDD carrier that includes a plurality of self-contained subframes.

At block 1102, a scheduling entity (e.g., eNB) may utilize a DL ACK delay block 322 (see FIG. 3) to determine a delay for a DL ACK transmission to be transmitted by the scheduling entity for a certain subordinate entity. The delay corresponds to an amount of time available for the scheduling entity to process an uplink data packet prior to transmitting the corresponding DL ACK. At block 1104, the scheduling entity may transmit the determined delay to the subordinate entity utilizing a control channel transmission. For example, the control channel may be a PDCCH.

At block 1106, the scheduling entity may receive the uplink data packet from the subordinate entity during a first subframe. For example, the subordinate entity may transmit the uplink data on a PUSCH. At block 1108, the scheduling entity, during a time period corresponding to the determined delay, decodes and/or processes the received uplink data packet and determines the contents of the downlink ACK feedback. For example, the downlink ACK may include an ACK or NACK. At block 1110, the scheduling entity transmits the downlink ACK feedback during a second subframe in accordance with the delay.

Signaling the Delay to Apply

In some examples, in order to enable this configurable delay for DL ACK feedback, the eNB or scheduling entity may determine the delay and may transmit the determined delay to be utilized to one or more UEs or subordinate entities utilizing any suitable control channel transmission. As one example, the delay may be indicated in a grant or transmission of scheduling information, which may be carried on the PDCCH (e.g., carried in the common DL burst 706 of FIG. 7).

Transmitting an indication of the delay to apply during the grant can provide rapid, dynamic configurability to the delay. That is, in this fashion, different delays could theoretically be applied in each subframe. However, in another aspect of the disclosure, a semi-static delay may be implemented, e.g., by utilizing radio resource control (RRC) signaling to the UE, which may be transmitted less frequently than every subframe. For example, a delay may be selected and conveyed at the time of an initial RRC connection setup between an eNB and UE, and may be maintained until such a time as the RRC connection is disconnected, and a new RRC connection is established. Within the scope of the present disclosure, any suitable control message transmission to the UE at any suitable interval may be utilized to convey the delay configuration.

In another example, if repetition is to be utilized (as described above in relation to range extension), the ACK/NACK repetition factor may be indicated by the eNB or scheduling entity in the grant or transmission of scheduling information.

In some examples, when repetition is utilized, early termination may also be utilized. Here, if a UE has poor channel conditions or high path loss, and a given repetition factor is signaled to that UE, it may occur that the ACK feedback is properly received at the eNB or scheduling entity in less than the given number of repetitions. In such case, the eNB or scheduling entity may be enabled to request early termination of the repeated transmissions prior to the UE reaching the maximum number of ACK feedback repetitions. Here, the eNB or scheduling entity may transmit a command for early termination of the ACK/NACK repetition via the common DL burst.

Further, when indicating the ACK delay within the grant or scheduling information transmission, the eNB or scheduling entity may additionally specify the resource (e.g., one or more resource elements or time-frequency resources, or a unique scrambling code or sequence for a particular user) for the UE to utilize for the ACK feedback transmission within the common UL burst. By specifying different resources, ACK feedback transmissions by multiple users may be differentiated and multiplexing of their respective transmissions within the common UL burst may be achieved.

Scheduling Decisions with Configurable Delay

In a further aspect of the disclosure, scheduling decisions by the eNB or scheduling entity may be made with a configurable delay after receiving the need UL information. For example, in a given subframe, an eNB or scheduling entity may determine, and transmit a grant or packet including scheduling information, for scheduling resources for one or more UEs or subordinate entities to utilize. Here, the scheduling decision or information may correspond to the scheduling of downlink packets, or for the scheduling of uplink packets. Further, the resources that are scheduled may in some examples appear within a common burst region, such as the common DL burst or the common UL burst, described above.

Figure 12:
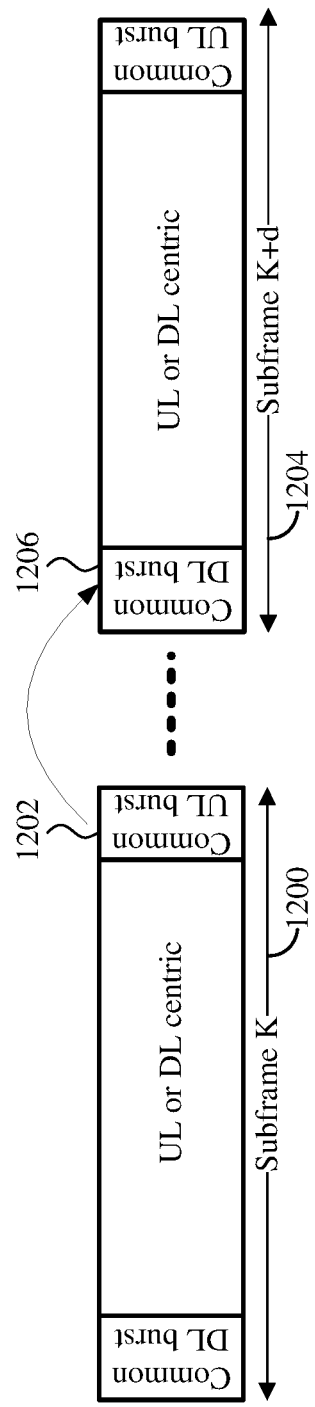
FIG. 12 is a diagram illustrating an example of a TDD frame structure implementing delayed scheduling decisions according to some aspects of the disclosure.

Referring now to FIG. 12, in each subframe 1200 (e.g., in subframe K), the UE or subordinate entity may transmit in its common UL burst 1202 certain information such as an SRS or a reference signal, so that the eNB or scheduling entity may detect the channel quality for that user; ACK feedback so that the eNB or scheduling entity may determine whether or not to schedule a retransmission; or a retransmission of an UL packet.

Based for example on the SRS, and following suitable processing and decision-making processing at the eNB or scheduling entity, this scheduling entity may determine which UE(s) or subordinate entity (entities) to schedule in a later subframe 1204 after a certain delay d. Here, by providing for a configurable delay between this transmission of control information in the common UL burst 1202, and the making of the scheduling decision by the scheduling entity, a relaxed or less demanding processing requirement at the eNB or scheduling entity may be provided. That is, by providing additional time (i.e., delay of one or more subframes) for the eNB or scheduling entity to make a scheduling decision until a later subframe, a scheduling grant 1206 may be transmitted a given number of subframes (e.g., subframe K+d 1204) after the eNB or scheduling entity receives the information it uses as parameters to make the scheduling decision.

Figure 13:
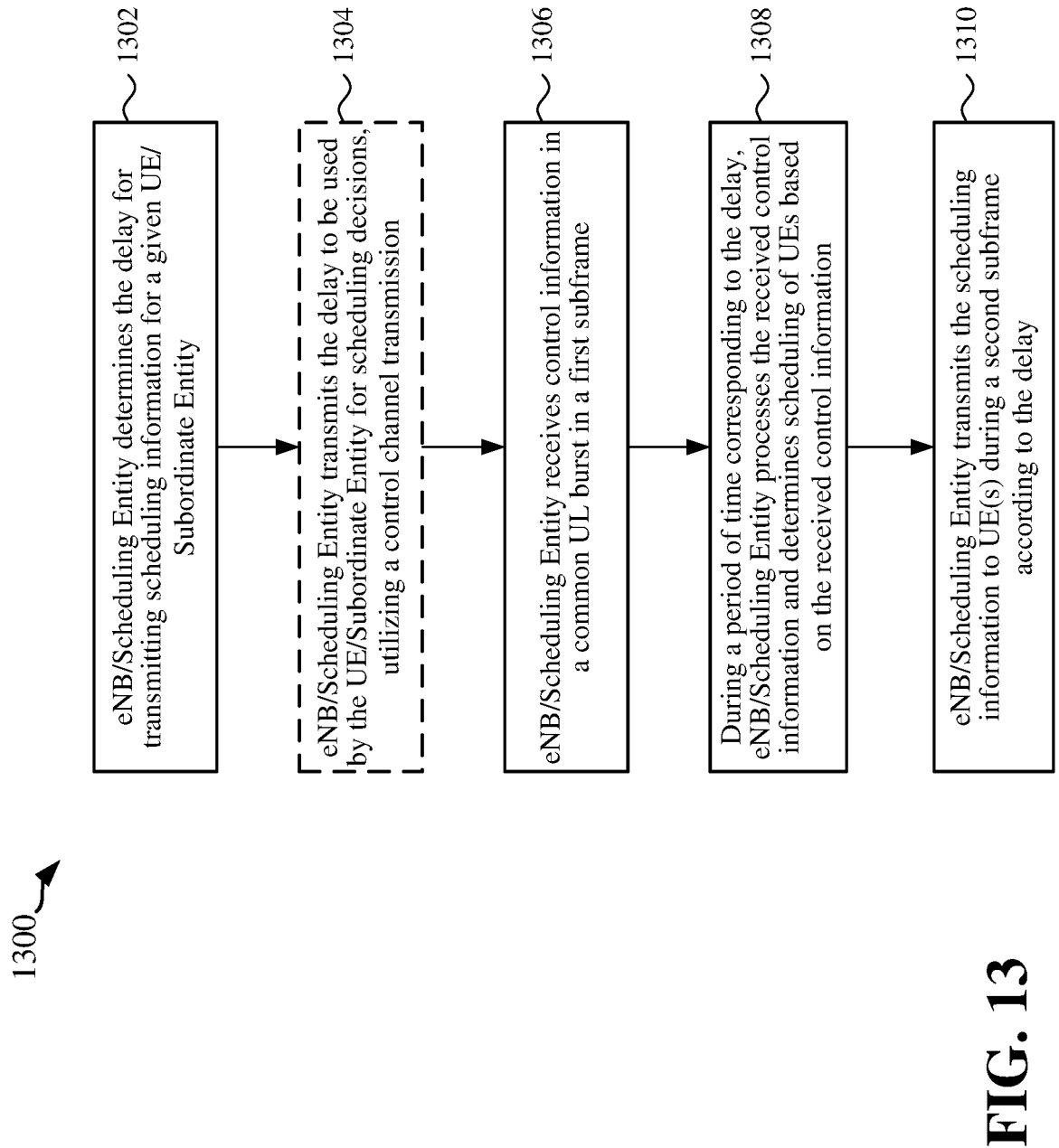
FIG. 13 is a flow chart illustrating an example of a process for implementing delayed scheduling decisions according to some aspects of the disclosure.

FIG. 13 is a flow chart illustrating an exemplary process 1300 for delaying the transmission of scheduling information corresponding to a configurable delay according to some aspects of the present disclosure, as described above and illustrated in FIG. 12. The process of FIG. 13 may be performed using any of the scheduling entities and subordinate entities illustrated in FIGS. 1-4 or other wireless communication devices. For example, in the process of FIG. 13, a scheduling entity 202 may communicate with a set of one or more subordinate entities 204 utilizing a TDD carrier that includes a plurality of self-contained subframes.

At block 1302, a scheduling entity (e.g., eNB) may utilize a scheduling delay block 324 (see FIG. 3) to determine a delay for transmitting scheduling information for a certain subordinate entity (e.g., UE). The delay corresponds to an amount of time available for the scheduling entity to process UL control information received from a set of subordinate entities including the subordinate entity prior to transmitting the scheduling information. At block 1304, the scheduling entity may transmit the determined delay to be used by the subordinate entity for scheduling decisions, utilizing a control channel transmission.

At block 1306, the scheduling entity receives control information in a common uplink burst from the set of subordinate entities during a first subframe. For example, the control information may be received in a common UL burst 1202 during a subframe K 1200 of FIG. 12. At block 1308, during a period of time corresponding to the determined delay, the scheduling entity processes the received control information and determines the scheduling information of the subordinate entity based on the received control information. The scheduling information may include time-frequency resources that the subordinate entity may use for UL or UL transmission in one or more subframe(s).

At block 1310, the scheduling entity transmits the scheduling information to the subordinate entity during a second subframe in accordance with the delay. Thus, while the UE or subordinate entity may transmit control information in a common UL burst, which may include information for making a scheduling decision, the eNB or scheduling entity may delay its decision if processing resources are limited. As illustrated in the example of FIG. 12, after making the scheduling decision, the eNB or scheduling entity may transmit the grant or scheduling information in a common DL burst in subframe K+d 1204.

UE Decodes/Applies Grant/Assignment with Configurable Delay

Figure 14:
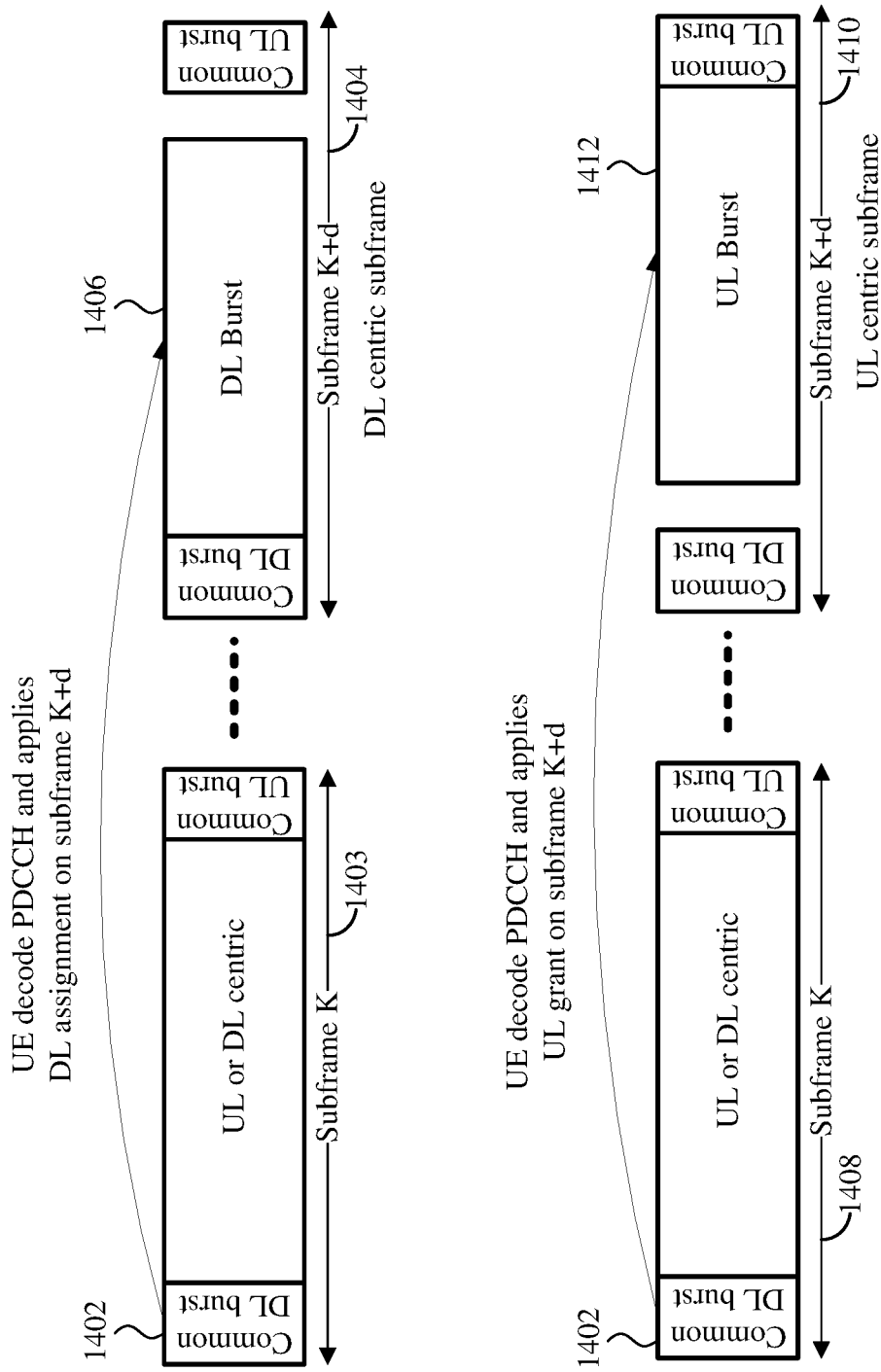
FIG. 14 is a diagram illustrating examples of a TDD frame structure implementing delayed application of scheduling grants or assignments of scheduled resources according to some aspects of the disclosure.

According to a further aspect of the disclosure, the delay between the time that a subordinate entity (e.g., UE) receives a grant or assignment of resources, and the time when the subordinate entity decodes and/or applies the grant or assignment, may be configurable. For example, FIG. 14 illustrates a configurable time (delay) for a UE or subordinate entity to decode and apply a received grant or assignment of resources according to some aspects of the present disclosure. In the two illustrated timelines, both illustrate a UE receiving a grant or assignment in a common DL burst 1402 during a subframe numbered K 1403. The subframe K may be an UL- or DL-centric subframe. Here, the UE or subordinate entity may delay the time until it decodes and/or process the control information received in the common DL burst 1402, in order to relax the processing requirements for the UE or subordinate entity.

In the first illustration of FIG. 14, a UE or subordinate entity may receive an assignment of resources for a forthcoming downlink transmission in a subframe K+d 1404. Here, the subframe K+d 1404 may be a DL-centric subframe, and the resources assigned in the grant or assignment received in the subframe K may appear within a downlink burst region 1406 of the subframe K+d. After or during a suitable delay (e.g., configured by utilizing the configurable delay control information as discussed above), the UE may decode the control information (i.e., the resource assignment) received in subframe K 1403. Accordingly, in accordance with the assignment received during subframe K, the UE or subordinate entity may apply the received assignment, and may configure its receiver to receive downlink information in the downlink burst region 1406 of subframe K+d.

In a further aspect of the disclosure corresponding to dynamic bandwidth switching, suppose the common DL burst region of a subframe is narrow band. In order for the UE to receive the downlink burst over the full bandwidth, there should be a signal ahead of time to tell the UE to open up or adjust its bandwidth. Accordingly, pre-scheduling, or at least an indicator, one or more subframes ahead of time may be utilized, e.g., by utilizing the scheme illustrated in the top illustration of FIG. 14. Here the indicator may inform the UE that during an identified subframe (e.g., subframe K+d), a wideband downlink may be transmitted to that UE, so the UE may accordingly configure its receiver circuit to open up its bandwidth. In this way a wideband downlink burst may be transmitted to the UE utilizing dynamic bandwidth switching.

In the second illustration of FIG. 14, a UE may receive, in a subframe K 1408, a grant of resources for a forthcoming uplink transmission in a subframe K+d 1410. Here, the subframe K+d 1410 may be an UL-centric subframe, and the resources granted in the grant received in the subframe K 1408 may appear within an UL burst region 1412 of the subframe K+d 1410. After or during a suitable delay (e.g., configured by utilizing configurable delay control information as discussed above), the UE or subordinate entity may decode the control information (i.e., the grant) received in subframe K 1408. Accordingly, in accordance with the grant received during the subframe K 1408, the UE or subordinate entity may apply the received grant, and may configure its transmitter to transmit uplink information in the uplink burst region 1412 of the subframe K+d.

Figure 15:
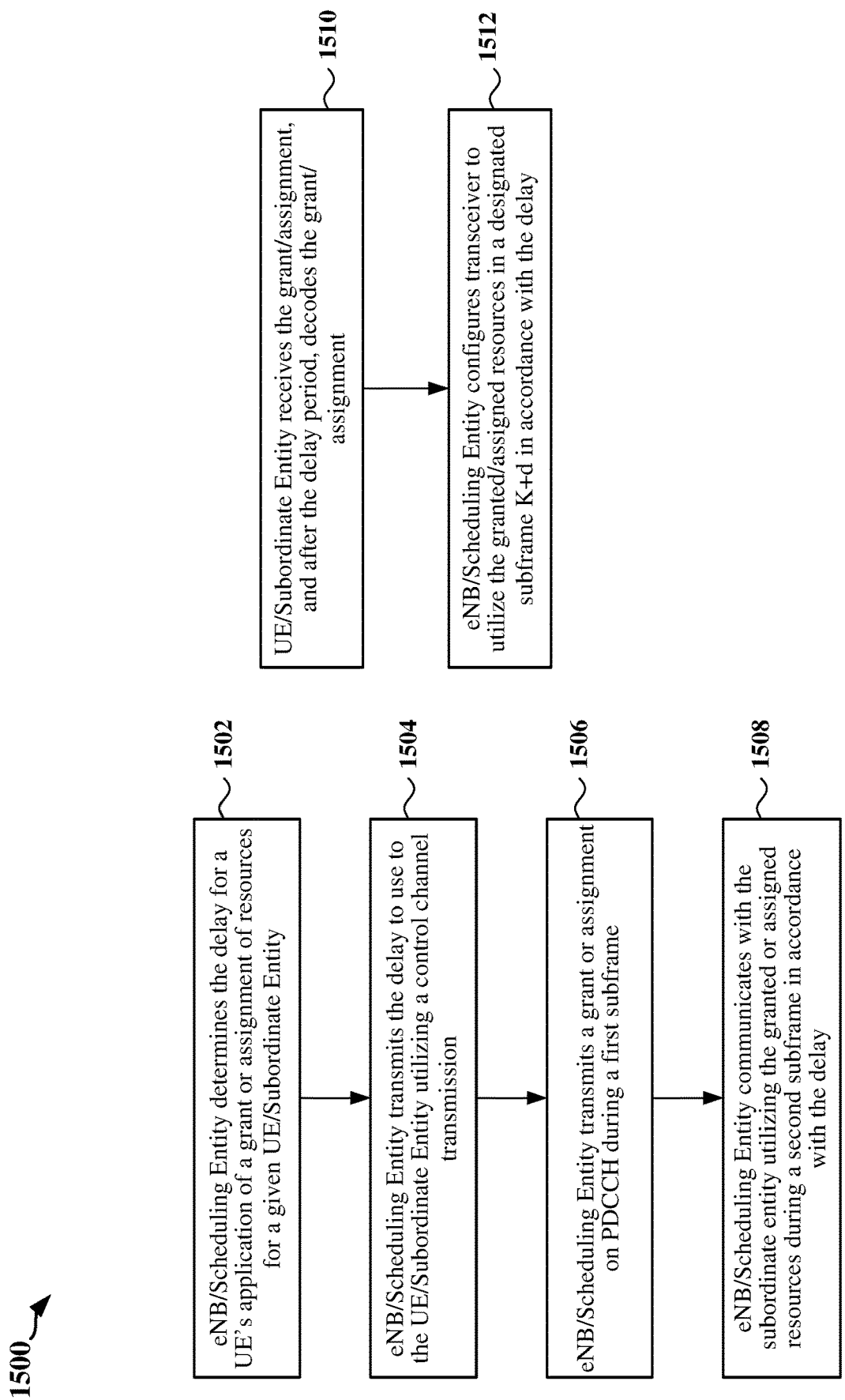
FIG. 15 is a flow chart illustrating an example of a process for implementing delayed application of scheduling grants or assignments of scheduled resources according to some aspects of the disclosure.

FIG. 15 is a flow chart illustrating an exemplary process 1500 for implementing a configurable delay for a subordinate entity or UE to apply a grant or assignment of resources in accordance with some aspects of the present disclosure. The process of FIG. 15 may be performed using any of the scheduling entities and subordinate entities illustrated in FIGS. 1-4 or other wireless communication devices. For example, in the process of FIG. 15, a scheduling entity 202 may communicate with a set of one or more subordinate entities 204 utilizing a TDD carrier that includes a plurality of self-contained subframes.

At block 1502, a scheduling entity (e.g., eNB) may utilize a scheduling grant/assignment delay block 326 to determine a delay for a subordinate entity or UE to apply or utilize a grant or assignment of resources. The delay corresponds to an amount of time available for the subordinate entity to process the grant or assignment prior to configuring a transceiver of the subordinate entity to utilize the granted or assigned resources. At block 1504, the scheduling entity transmits the determined delay to the subordinate entity utilizing a control channel transmission. For example, the scheduling entity may transmit the delay in a common DL burst 1402 of a subframe K of FIG. 14.

At block 1506, the scheduling entity transmits the grant or assignment of resources to the subordinate entity during a first subframe. For example, the scheduling entity may transmit the grant or assignment of resources during the subframe K of FIG. 4. In some aspects of the disclosure, the subordinate entity may transmit the delay and the grant/assignment of resources via a PDCCH or common DL burst in the same subframe. In some aspects of the disclosure, the subordinate entity may transmit the delay and the grant/assignment of resources in different subframes.

At block 1508, the scheduling entity communicates with the subordinate entity utilizing the granted or assigned resources during a second subframe in accordance with the delay. For example, the scheduling entity may communicate with the subordinate entity utilizing the granted or assigned resources during the subframe K+d of FIG. 14. On the subordinate entity side, at block 1510, the subordinate entity may receive the grant/assignment, and after or during the delay period, decodes the grant/assignment. Then, at block 1512, the subordinate entity may configure its transceiver to utilize the granted/assigned resources in a certain subframe K+d in accordance with the received delay.

In one configuration, the apparatus 202 and/or 204 for wireless communication includes means for determining a delay for an uplink ACK transmission to be transmitted by a subordinate entity, wherein the delay corresponds to an amount of time available for the subordinate entity to process a downlink data packet prior to transmitting the uplink ACK; means for transmitting the determined delay to the subordinate entity utilizing a control channel transmission during a first subframe; means for transmitting the downlink data packet to the subordinate entity during the first subframe; and means for receiving the uplink ACK from the subordinate entity during a second subframe in accordance with the delay.

In one configuration, the apparatus 202 and/or 204 for wireless communication includes means for determining a delay for a downlink ACK transmission to be transmitted by a scheduling entity, wherein the delay corresponds to an amount of time available for the scheduling entity to process an uplink data packet prior to transmitting the downlink ACK; means for receiving the uplink data packet from a subordinate entity during a first subframe; means for during a time period corresponding to the determined delay, processing the received uplink data packet and determining contents of the downlink ACK; and means for transmitting the downlink ACK during a second subframe in accordance with the delay.

In one configuration, the apparatus 202 and/or 204 for wireless communication includes means for determining a delay for transmitting scheduling information for a subordinate entity, wherein the delay corresponds to an amount of time available for the scheduling entity to process uplink control information received from a set of subordinate entities including a subordinate entity prior to transmitting the scheduling information; means for receiving control information in a common uplink burst from the set of subordinate entities during a first subframe; means for during a period of time corresponding to the determined delay, processing the received control information and determining the scheduling information of the subordinate entity based on the received control information; and means for transmitting the scheduling information to the subordinate entity during a second subframe in accordance with the delay.

In one configuration, the apparatus 202 and/or 204 for wireless communication includes means for determining a delay for a subordinate entity to apply a grant or assignment of resources, wherein the delay corresponds to an amount of time available for the subordinate entity to process the grant or assignment prior to configuring a transceiver to utilize the granted or assigned resources; means for transmitting the determined delay to the subordinate entity utilizing a control channel transmission; means for transmitting the grant or assignment of resources to the subordinate entity during a first subframe; and means for communicating with the subordinate entity utilizing the granted or assigned resources during a second subframe in accordance with the delay.

In one aspect, the aforementioned means may be the processor(s) 304 and/or 404 in which the invention resides from FIGS. 3 and 4 configured to perform the functions recited by the aforementioned means. In another aspect, the aforementioned means may be a circuit or any apparatus configured to perform the functions recited by the aforementioned means.

Of course, in the above examples, the circuitry included in the processors 304 and 404 are merely provided as an example, and other means for carrying out the described functions may be included within various aspects of the present disclosure, including but not limited to the instructions stored in the computer-readable storage medium 306 and 406, or any other suitable apparatus or means described in any one of the FIGS. 1-4, and utilizing, for example, any of the processes and/or algorithms described herein in relation to FIGS. 8-15.

As those skilled in the art will readily appreciate, various aspects described throughout this disclosure may be extended to any suitable telecommunication system, network architecture, and communication standard. By way of example, various aspects may be applied to UMTS systems such as W-CDMA, TD-SCDMA, and TD-CDMA.

Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication, the method comprising:
    determining a configurable delay for an uplink acknowledgment (ACK) transmission to be transmitted by a subordinate entity utilizing a plurality of subframes, wherein the configurable delay corresponds to an integer number of subframes available for the subordinate entity to process a downlink data packet prior to transmitting the uplink ACK;

transmitting to the subordinate entity a grant of resources of a first subframe of the plurality of subframes, the grant indicating the configurable delay;

transmitting the downlink data packet to the subordinate entity during the first subframe using the resources; and receiving the uplink ACK from the subordinate entity during a second subframe of the plurality of subframes in accordance with the configurable delay.

2. The method of claim 1, wherein the determining the configurable delay comprises determining different configurable delays for two or more subordinate entities, respectively, based on channel conditions.

3. The method of claim 1, wherein the first subframe comprises a downlink-centric subframe, and the second subframe comprises a downlink-centric subframe.

4. The method of claim 1, wherein the first subframe comprises a downlink-centric subframe, and the second subframe comprises an uplink-centric subframe.

5. The method of claim 1, wherein the first subframe and the second subframe are separated by one or more subframes.

6. The method of claim 1, wherein the first subframe and the second subframe are the same subframe.

7. The method of claim 1, wherein the grant of resources further comprises a grant for the uplink ACK.

8. The method of claim 1, wherein the plurality of subframes comprise time division duplex subframes.

9. A method of wireless communication, the method comprising:

determining a configurable delay for a control information transmission to be transmitted by a scheduling entity to a subordinate entity, utilizing a plurality of subframes comprising a first subframe and a second subframe, wherein the configurable delay corresponds to an integer number of subframes available for the scheduling entity to process a data packet received from the subordinate entity in the first subframe prior to transmitting the control information transmission in the second subframe;

receiving, from the subordinate entity, the data packet during the first subframe; and transmitting the control information transmission to the subordinate entity during the second subframe in accordance with the configurable delay, the control information transmission comprising a grant of resources of the second subframe, based on the data packet.

10. The method of claim 9, further comprising:

during a time period corresponding to the determined configurable delay, processing an uplink data packet included in the data packet received from the subordinate entity and determining contents of a downlink acknowledgment (ACK) included in the control information transmission.

11. The method of claim 10, wherein the determining the configurable delay comprises determining different configurable delays for two or more subordinate entities, respectively, based on channel conditions.

12. The method of claim 10, wherein the first subframe comprises an uplink-centric subframe, and the second subframe comprises a downlink-centric subframe.

13. The method of claim 10, wherein the first subframe comprises an uplink-centric subframe, and the second subframe comprises an uplink-centric subframe.

14. The method of claim 10, wherein the first subframe and the second subframe are separated by one or more subframes.

15. The method of claim 10, wherein the first subframe and the second subframe are the same subframe.

16. The method of claim 9, wherein the control information transmission comprises scheduling information for the subordinate entity, and the data packet comprises control information received from a set of subordinate entities including the subordinate entity; further comprising:

receiving the control information in a common uplink burst from the set of subordinate entities during the first subframe;

during a period of time corresponding to the determined configurable delay, processing the received control information and determining the scheduling information of the subordinate entity based on the received control information; and transmitting the scheduling information to the subordinate entity during the second subframe in accordance with the configurable delay.

17. The method of claim 9, wherein the plurality of subframes comprise time division duplex subframes.

18. A method of wireless communication, the method comprising:

determining a configurable delay for a subordinate entity to apply a grant or assignment of resources for utilizing a plurality of subframes comprising a first subframe and a second subframe, wherein the configurable delay corresponds to an integer number of subframes available for the subordinate entity to process the grant or assignment prior to configuring a transceiver of the subordinate entity to utilize the resources;

transmitting, in the first subframe, the grant or assignment of resources, indicating the configurable delay and the resources for transmitting downlink data in a data portion of the second subframe, to the subordinate entity; and communicating, in the second subframe, with the subordinate entity utilizing the resources in the data portion of the second subframe in accordance with the configurable delay.

19. The method of claim 18, wherein the determining the configurable delay comprises determining different configurable delays for two or more subordinate entities, respectively, based on channel conditions.

20. The method of claim 18, wherein the second subframe comprises a downlink-centric subframe.

21. The method of claim 18, wherein the second subframe comprises an uplink-centric subframe.

22. The method of claim 18, wherein the first subframe and the second subframe are separated by one or more subframes.

23. The method of claim 18, wherein the first subframe and the second subframe are the same subframe.

24. The method of claim 18, wherein the plurality of subframes comprise time division duplex subframes.

25. An apparatus for wireless communication, comprising:

a communication interface configured to communicate with one or more subordinate entities utilizing a plurality of subframes;

a memory comprising executable code; and a processor operatively coupled to the communication interface and memory, wherein the processor is configured by the executable code to:

determine a configurable delay for an uplink acknowledgment (ACK) transmission to be transmitted by a subordinate entity, wherein the configurable delay corresponds to an integer number of subframes available for the subordinate entity to process a downlink data packet prior to transmitting the uplink ACK;

transmit to the subordinate entity a grant of resources of a first subframe of the plurality of subframes, the grant indicating the configurable delay;

transmit the downlink data packet to the subordinate entity during the first subframe using the resources; and receive the uplink ACK from the subordinate entity during a second subframe of the plurality of subframes in accordance with the configurable delay.

26. The apparatus of claim 25, wherein the processor is further configured to determine different configurable delays for two or more subordinate entities, respectively, based on channel conditions.

27. The apparatus of claim 25, wherein the first subframe comprises a downlink-centric subframe, and the second subframe comprises a downlink-centric subframe.

28. The apparatus of claim 25, wherein the first subframe comprises a downlink-centric subframe, and the second subframe comprises an uplink-centric subframe.

29. The apparatus of claim 25, wherein the first subframe and the second subframe are separated by one or more subframes.

30. The apparatus of claim 25, wherein the first subframe and the second subframe are the same subframe.

31. The apparatus of claim 25, wherein the grant of resources further comprises a grant for the uplink ACK.

32. The apparatus of claim 25, wherein the plurality of subframes comprise time division duplex subframes.

33. An apparatus for wireless communication, comprising:

a communication interface configured to communicate with one or more subordinate entities utilizing a plurality of subframes comprising a first subframe and a second subframe;

a memory comprising executable code; and a processor operatively coupled to the communication interface and memory, wherein the processor is configured by the executable code to:

determine a configurable delay for a control information transmission to be transmitted by the apparatus to a subordinate entity, wherein the configurable delay corresponds to an integer number of subframes available for the apparatus to process a data packet received from the subordinate entity in the first subframe prior to transmitting the control information transmission in the second subframe;

receive the data packet from the subordinate entity during the first subframe; and transmit the control information transmission to the subordinate entity during the second subframe in accordance with the configurable delay, the control information transmission comprising a grant of resources of the second subframe, based on the data packet.

34. The apparatus of claim 33, wherein the processor is further configured to:

during a time period corresponding to the determined configurable delay, process an uplink data packet included in the data packet received from the subordinate entity and determine contents of a downlink acknowledgment (ACK) included in the control information transmission.

35. The apparatus of claim 34, wherein the processor is further configured to determine different configurable delays for two or more subordinate entities, respectively, based on channel conditions.

36. The apparatus of claim 34, wherein the first subframe comprises an uplink-centric subframe, and the second subframe comprises a downlink-centric subframe.

37. The apparatus of claim 34, wherein the first subframe comprises an uplink-centric subframe, and the second subframe comprises an uplink-centric subframe.

38. The apparatus of claim 34, wherein the first subframe and the second subframe are separated by one or more subframes.

39. The apparatus of claim 34, wherein the first subframe and the second subframe are the same subframe.

40. The apparatus of claim 33, wherein the control information transmission comprises scheduling information for the subordinate entity, and the data packet comprises control information received from a set of subordinate entities including the subordinate entity; wherein the processor is further configured to:

receive the control information in a common uplink burst from the set of subordinate entities during the first subframe;

during a period of time corresponding to the determined configurable delay, process the received control information and determine the scheduling information of the subordinate entity based on the received control information; and transmit the scheduling information to the subordinate entity during the second subframe in accordance with the configurable delay.

41. The apparatus of claim 33, wherein the plurality of subframes comprise time division duplex subframes.

42. An apparatus for wireless communication, comprising:

a communication interface configured to communicate with one or more subordinate entities utilizing a plurality of subframes comprising a first subframe and a second subframe;

a memory comprising executable code; and a processor operatively coupled to the communication interface and memory, wherein the processor is configured by the executable code to:

determine a configurable delay for a subordinate entity to apply a grant or assignment of resources for utilizing the plurality of subframes, wherein the configurable delay corresponds to an integer number of subframes available for the subordinate entity to process the grant or assignment prior to configuring a transceiver of the subordinate entity to utilize the resources;

transmit, in the first subframe, the grant or assignment of resources, indicating the configurable delay and resources for transmitting downlink data in a data portion of the second subframe, to the subordinate entity; and communicate, in the second subframe, with the subordinate entity utilizing the resources in the data portion of the second subframe in accordance with the configurable delay.

43. The apparatus of claim 42, wherein the processor is further configured to determine different configurable delays for two or more subordinate entities, respectively, based on channel conditions.

44. The apparatus of claim 42, wherein the second subframe comprises a downlink-centric subframe.

45. The apparatus of claim 42, wherein the second subframe comprises an uplink-centric subframe.

46. The apparatus of claim 42, wherein the first subframe and the second subframe are separated by one or more subframes.

47. The apparatus of claim 42, wherein the first subframe and the second subframe are the same subframe.

48. The apparatus of claim 42, wherein the plurality of subframes comprise time division duplex subframes.

49. A method of wireless communication for a user equipment (UE) to communicate with a scheduling entity, the method comprising:
receiving, in a first subframe of a plurality of subframes, from the scheduling entity a grant of resources of the first subframe, wherein the grant indicates a configurable delay corresponding to an integer number of subframes available for the UE to process a downlink data packet prior to transmitting an uplink acknowledgment (ACK) transmission;
receiving the downlink data packet from the scheduling entity during the first subframe using the resources; and
transmitting the uplink ACK to the scheduling entity during a second subframe of the plurality of subframes in accordance with the configurable delay.

50. The method of claim 49, wherein the first subframe comprises a downlink-centric subframe, and the second subframe comprises a downlink-centric subframe.

51. The method of claim 49, wherein the first subframe comprises a downlink-centric subframe, and the second subframe comprises an uplink-centric subframe.

52. The method of claim 49, wherein the first subframe and the second subframe are separated by one or more subframes.

53. The method of claim 49, wherein the first subframe and the second subframe are the same subframe.

54. The method of claim 49, wherein the grant of resources further comprises a grant for the uplink ACK.

55. The method of claim 49, wherein the plurality of subframes comprise time division duplex subframes.

56. A method of wireless communication for a user equipment (UE) to communicate with a scheduling entity, the method comprising:
transmitting, to the scheduling entity, a data packet in a first subframe of a plurality of subframes; and
receiving control information from the scheduling entity during a second subframe of the plurality of subframes in accordance with a configurable delay configured by the scheduling entity,
wherein the configurable delay corresponds to an integer number of subframes available for the scheduling entity to process the data packet transmitted by the UE in the first subframe prior to transmitting the control information to the UE in the second subframe, the control information comprising a grant of resources of the second subframe, based on the data packet.

57. The method of claim 56, further comprising:
transmitting an uplink data packet included in the data packet to the scheduling entity during the first subframe; and
receiving a downlink acknowledgment (ACK) included in the control information during the second subframe in accordance with the configurable delay.

58. The method of claim 57, wherein the first subframe comprises an uplink-centric subframe, and the second subframe comprises a downlink-centric subframe.

59. The method of claim 57, wherein the first subframe comprises an uplink-centric subframe, and the second subframe comprises an uplink-centric subframe.

60. The method of claim 57, wherein the first subframe and the second subframe are separated by one or more subframes.

61. The method of claim 57, wherein the first subframe and the second subframe are the same subframe.

62. The method of claim 56, wherein the plurality of subframes comprise time division duplex subframes.

63. A method of wireless communication for a subordinate entity to communicate with a scheduling entity utilizing a plurality of subframes comprising a first subframe and a second subframe, the method comprising:
receiving, in the first subframe, from the scheduling entity a grant or assignment of resources, wherein the grant or assignment indicates the resources for transmitting downlink data in a data portion of the second subframe, and a configurable delay corresponding to an integer number of subframes available for the subordinate entity to process the grant or assignment of resources prior to configuring a transceiver of the subordinate entity to utilize the resources; and
communicating, in the second subframe, with the scheduling entity utilizing the resources in the data portion of the second subframe in accordance with the configurable delay.

64. The method of claim 63, wherein the second subframe comprises a downlink-centric subframe.

65. The method of claim 63, wherein the second subframe comprises an uplink-centric subframe.

66. The method of claim 63, wherein the first subframe and the second subframe are separated by one or more subframes.

67. The method of claim 63, wherein the first subframe and the second subframe are the same subframe.

68. The method of claim 63, wherein the plurality of subframes comprise time division duplex subframes.

69. A user equipment (UE) for wireless communication, comprising:
a communication interface configured to communicate with a scheduling entity utilizing a plurality of subframes including a first subframe and a second subframe;
a memory comprising executable code; and
a processor operatively coupled to the communication interface and memory,
wherein the processor is configured by the executable code to:
receive, in the first subframe, from the scheduling entity a grant of resources of the first subframe, wherein the grant indicates a configurable delay corresponding to an integer number of subframes available for the UE to process a downlink data packet prior to transmitting an uplink acknowledgment (ACK) transmission;
receive, using the resources, the downlink data packet from the scheduling entity during the first subframe; and
transmit the uplink ACK to the scheduling entity during the second subframe in accordance with the configurable delay.

70. The UE of claim 69, wherein the first subframe comprises a downlink-centric subframe, and the second subframe comprises a downlink-centric subframe.

71. The UE of claim 69, wherein the first subframe comprises a downlink-centric subframe, and the second subframe comprises an uplink-centric subframe.

72. The UE of claim 69, wherein the first subframe and the second subframe are separated by one or more subframes.

73. The UE of claim 69, wherein the first subframe and the second subframe are the same subframe.

74. The UE of claim 69, wherein the grant of resources further comprises a grant for the uplink ACK.

75. The UE of claim 69, wherein the plurality of subframes comprise time division duplex subframes.

76. A user equipment (UE) for wireless communication, comprising:
  a communication interface configured to communicate with a scheduling entity utilizing a plurality of subframes including a first subframe and a second subframe;
  a memory comprising executable code; and
  a processor operatively coupled to the communication interface and memory,
  wherein the processor is configured by the executable code to:
  transmit, to the scheduling entity, a data packet in the first subframe; and
  receive control information from the scheduling entity during the second subframe in accordance with a configurable delay configured by the scheduling entity, wherein the configurable delay corresponds to an integer number of subframes available for the scheduling entity to process the data packet transmitted by the UE in the first subframe prior to transmitting the control information to the UE in the second subframe, the control information comprising a grant of resources of the second subframe, based on the data packet.

77. The UE of claim 76, wherein the processor is further configured to:
  transmit an uplink data packet included in the data packet to the scheduling entity during the first subframe; and
  receive a downlink acknowledgment (ACK) included in the control information during the second subframe in accordance with the configurable delay.

78. The UE of claim 77, wherein the first subframe comprises an uplink-centric subframe, and the second subframe comprises a downlink-centric subframe.

79. The UE of claim 77, wherein the first subframe comprises an uplink-centric subframe, and the second subframe comprises an uplink-centric subframe.

80. The UE of claim 77, wherein the first subframe and the second subframe are separated by one or more subframes.

81. The UE of claim 77, wherein the first subframe and the second subframe are the same subframe.

82. The UE of claim 76, wherein the plurality of subframes comprise time division duplex subframes.

83. A user equipment (UE) for wireless communication, comprising:
  a communication interface configured to communicate with a scheduling entity utilizing a plurality of subframes including a first subframe and a second subframe;
  a memory comprising executable code; and
  a processor operatively coupled to the communication interface and memory,
  wherein the processor is configured by the executable code to:
  receive, in the first subframe, from the scheduling entity a grant or assignment of resources, wherein the grant or assignment indicates the resources for transmitting downlink data in a data portion of the second subframe, and a configurable delay corresponding to an integer number of subframes available for the UE to process the grant or assignment prior to configuring the communication interface to utilize the resources; and
  communicate, in the second subframe, with the scheduling entity utilizing the resources in the data portion of the second subframe in accordance with the configurable delay.

84. The UE of claim 83, wherein the second subframe comprises a downlink-centric subframe.

85. The UE of claim 83, wherein the second subframe comprises an uplink-centric subframe.

86. The UE of claim 83, wherein the first subframe and the second subframe are separated by one or more subframes.

87. The UE of claim 83, wherein the first subframe and the second subframe are the same subframe.

88. The UE of claim 83, wherein the plurality of subframes comprise time division duplex subframes.

\* \* \* \* \*